(12) United States Patent
Kim et al.

(10) Patent No.: US 8,758,868 B2
(45) Date of Patent: *Jun. 24, 2014

(54) OPTICAL DEVICE

(75) Inventors: Sin Young Kim, Daejeon (KR); Kyung Ki Hong, Chungcheongbukdo (KR); Moon Soo Park, Daejeon (KR); Seung Hun Chae, Daejeon (KR); Eun Mi Seo, Daejeon (KR); Doo Young Huh, Chungcheongbuk-do (KR); Hyuk Yoon, Gwangmyeong-si (KR); Kyun Il Rah, Daejeon (KR); Su Young Ryu, Daejeon (KR)

(73) Assignee: LG Chem Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/455,941

(22) Filed: Apr. 25, 2012

(65) Prior Publication Data

US 2012/0262639 A1 Oct. 18, 2012

Related U.S. Application Data

(63) Continuation-in-part of application No. PCT/KR2011/008591, filed on Nov. 10, 2011.

(30) Foreign Application Priority Data

| Nov. 10, 2010 | (KR) | 10-2010-0111757 |
|---|---|---|
| Nov. 10, 2010 | (KR) | 10-2010-0111758 |
| Dec. 7, 2010 | (KR) | 10-2010-0124411 |
| Jun. 15, 2011 | (KR) | 10-2011-0057830 |
| Oct. 26, 2011 | (KR) | 10-2011-0010096 |
| Oct. 26, 2011 | (KR) | 10-2011-0110092 |
| Oct. 26, 2011 | (KR) | 10-2011-0110093 |
| Nov. 10, 2011 | (KR) | 10-2011-0117238 |

(51) Int. Cl.
G02F 1/1333 (2006.01)
G02F 1/1335 (2006.01)
G02B 27/26 (2006.01)
G02B 5/30 (2006.01)

(52) U.S. Cl.
USPC .............. 428/1.1; 428/1.31; 428/1.5; 349/15; 349/98; 349/193; 359/465

(58) Field of Classification Search
USPC ............................ 428/1.1, 1.31, 1.5; 359/465; 252/299.01, 299.5, 299.67; 349/15, 96, 349/183, 193
See application file for complete search history.

(56) References Cited

U.S. PATENT DOCUMENTS

| 2008/0170294 A1* | 7/2008 | Kuroda et al. ................. 359/500 |
| 2008/0252973 A1* | 10/2008 | Akari et al. ..................... 359/485 |
| 2011/0293856 A1 | 12/2011 | Fukatani et al. |

(Continued)

FOREIGN PATENT DOCUMENTS

| JP | 8-209095 | 8/1996 |
| JP | 10-153707 | 6/1998 |

(Continued)

*Primary Examiner* — Shean C Wu
(74) *Attorney, Agent, or Firm* — McKenna, Long & Aldridge, LLP.

(57) ABSTRACT

An optical device is provided. The optical device according to one embodiment may be a light-dividing device, for example, a device that can divide incident light into at least two kinds of light having different polarization states. For example, the optical device can be used to realize a stereoscopic image.

23 Claims, 12 Drawing Sheets

(56) References Cited

U.S. PATENT DOCUMENTS

| | | | |
|---|---|---|---|
| 2012/0257129 A1* | 10/2012 | Seo et al. | 349/15 |
| 2013/0027620 A1* | 1/2013 | Kim et al. | 349/15 |
| 2013/0083262 A1* | 4/2013 | Kim et al. | 349/15 |

FOREIGN PATENT DOCUMENTS

| | | |
|---|---|---|
| JP | 2000072833 A | 3/2000 |
| JP | 2001-059962 | 3/2001 |
| JP | 2008239569 | 10/2008 |
| JP | 2008-287207 | 11/2008 |
| JP | 2008287207 | 11/2008 |
| KR | 10-2008-0034405 | 4/2008 |
| TW | 200804569 | 1/2008 |
| WO | 2010067809 A1 | 6/2010 |

* cited by examiner

Fig. 3

| A | B | A | B | A | B |
|---|---|---|---|---|---|
| B | A | B | A | B | A |
| A | B | A | B | A | B |
| B | A | B | A | B | A |
| A | B | A | B | A | B |
| B | A | B | A | B | A |

Fig. 12

| LG | RG | LG | RG | LG | RG |
|----|----|----|----|----|----|
| RG | LG | RG | LG | RG | LG |
| LG | RG | LG | RG | LG | RG |
| RG | LG | RG | LG | RG | LG |
| LG | RG | LG | RG | LG | RG |
| RG | LG | RG | LG | RG | LG |

OPTICAL DEVICE

CROSS-REFERENCE TO RELATED APPLICATION

This application is a Continuation-In-Part (CIP) based on International Application No. PCT/KR2011/008591, filed on Nov. 10, 2011, which claims the benefit of Korean Patent Application Nos. 10-2010-0111757, filed on Nov. 10, 2010, 10-2010-0111758, filed on Nov. 10, 2010, 10-2010-0124411, filed on Dec. 7, 2010, 10-2011-0057830, filed on Jun. 15, 2011, 10-2011-0110092, filed on Oct. 26, 2011, 10-2011-0110093, filed on Oct. 26, 2011, 10-2011-0110096, filed on Oct. 26, 2011, and 10-2011-0117238, filed on Nov. 10, 2011, which are hereby incorporated by reference in their entirety as if fully set forth herein.

BACKGROUND

1. Field

This application relates to an optical device and a stereoscopic image display device.

2. Discussion of Related Art

Light division techniques relate to dividing light into at least two kinds of light having different polarization states and have been used in various fields.

The light division techniques may be, for example, applied to form stereoscopic images. The stereoscopic images may be formed using binocular parallax. For example, if two 2-dimensional images are input into the human left and right eyes, respectively, the input information is transmitted to and combined in the brain, it becomes possible for a human being to experience 3-dimensional (3D) senses of depth and reality. During the above process, the light division techniques may be used.

Techniques to form the stereoscopic image may be effectively used for 3D measurements, and also used in 3D TV, cameras or computer graphics.

SUMMARY

One aspect of this application is related to an optical device. In one embodiment, the optical device may include a liquid crystal layer and a polarizer. The polarizer and the liquid crystal layer may be attached to each other by an adhesive layer. As the adhesive layer, an adhesive of which a glass transition temperature of 36° C. or more may be used.

In one embodiment, the term "optical device" as used herein may include every kinds of optical apparatuses, optical parts or optical elements, each of which exhibits one or more predetermined optical function. In one embodiment, the "optical device" may refer to a device having a sheet or film shape. For example, the optical device may be a device configured to divide incident light into two or more kinds of light having different polarization states to each other. Such a device may be, for example, used to obtain a stereoscopic image.

The polarizer in the optical device may be a functional element capable of extracting light that vibrates in one direction from incident light vibrating in multiple directions. For example, a conventional polarizer such as a polyvinyl alcohol (PVA) polarizer may be used as the polarizer.

In one embodiment, the polarizer may be a PVA film or sheet in which a dichroic dye or iodine is absorbed and aligned. The PVA may, for example, be obtained by gellation of a polyvinylacetate. Examples of the polyvinylacetate may include a homopolymer of vinyl acetate; and a copolymer of vinyl acetate and another monomer. In the above, examples of the other monomer copolymerized with vinyl acetate may include at least one selected from an unsaturated carboxylic acid compound, an olefin compound, a vinylether compound, an unsaturated sulfonic acid compound and an acrylamide compound having an ammonium group. A gelling degree of the polyvinylacetate may generally be in a range of approximately 85 mol % to approximately 100 mol %, or 98 mol % to 100 mol %. A polymerization degree of the PVA in the polarizer may generally be in a range of approximately 1,000 to approximately 10,000, or approximately 1,500 to approximately 5,000.

The optical device includes a liquid crystal layer attached to the polarizer by an adhesive layer. FIG. 1 shows an illustrative embodiment of the optical device 1, and shows a structure in which a polarizer 11 and a liquid crystal layer 13 are attached to each other by an adhesive layer 12. The liquid crystal layer may be a phase retardation layer having a phase retardation property.

In one embodiment, the liquid crystal layer may include a polymerizable liquid crystal compound. In one embodiment, the polymerizable liquid crystal compound may be included in the liquid crystal layer in a polymerized form. The term "polymerizable liquid crystal compound" as used herein may refer to a compound that includes at least one part capable of showing liquid crystalline property, such as a mesogen backbone, and also includes at least one polymerizable functional group. Also, the term "polymerizable liquid crystal compound included in a polymerized form" may refer to a state where the liquid crystal compound is polymerized so as to form a skeleton of a liquid crystal polymer, such as a main chain or a side chain, in the liquid crystal layer.

In one embodiment, the liquid crystal layer may also include a polymerizable liquid crystal compound that is not polymerized, or may further include a conventional additive such as a polymerizable non-liquid crystalline compound, a stabilizer, a non-polymerizable non-liquid crystalline compound or an initiator.

In one embodiment, the polymerizable liquid crystal compound in the liquid crystal layer may include a multifunctional polymerizable liquid crystal compound and a monofunctional polymerizable liquid crystal compound.

The term "multifunctional polymerizable liquid crystal compound" as used herein may refer to a liquid crystal compound including at least two polymerizable functional groups among the liquid crystal compounds. In one embodiment, the multifunctional polymerizable liquid crystal compound may include 2 to 10, 2 to 8, 2 to 6, 2 to 5, 2 to 4, 2 to 3, or 2 polymerizable functional groups. Also, the term "monofunctional polymerizable liquid crystal compound" as used herein may refer to a liquid crystal compound including one polymerizable functional group among the liquid crystal compounds.

If the liquid crystal layer includes both of the multifunctional and monofunctional polymerizable compounds, the phase retardation properties of the liquid crystal layer may be effectively controlled, and the realized phase retardation properties such as the optical axis and a phase retardation value thereof, may be stably maintained. The term "optical axis" as used herein may refer to a slow axis or fast axis when light passes through a certain region.

The liquid crystal layer may include the monofunctional polymerizable liquid crystal compound in an amount of greater than 0 parts by weight and not more than 100 parts by weight, 1 to 90 parts by weight, 1 to 80 parts by weight, 1 to 70 parts by weight, 1 to 60 parts by weight, 1 to 50 parts by weight, 1 to 30 parts by weight or 1 to 20 parts by weight, relative to 100 parts by weight of the multifunctional polymerizable liquid crystal compound.

The effect obtained by mixing the multifunctional and monofunctional polymerizable liquid crystal compounds may be maximized within the above weight ratios. Also, the liquid crystal layer may exhibit an excellent adhesive property to the adhesive layer. Unless defined otherwise, the unit "part by weight" may refer to a weight ratio herein.

The optical device may satisfy the following Equation 1.

$$X<8\% \quad \text{Equation 1}$$

In Equation 1, X represents a percentage of the absolute value of a variation in a phase difference value of the liquid crystal layer obtained after keeping the optical device at 80° C. for 100 hours or 250 hours, relative to the initial phase difference value of the liquid crystal layer of the optical device.

The "X" may be, for example, calculated by the formula "$100 \times (|R_0 - R_1|)/R_0$." In the above, the "$R_0$" is an initial phase difference value of the liquid crystal layer of the optical device, and the "$R_1$" is a phase difference value of the liquid crystal layer obtained after keeping the optical device at 80° C. for 100 hours or 250 hours.

The "X" may be, for example, 7% or less, 6% or less or 5% or less. The variation in the phase difference value may be measured using a method presented in the following Examples.

In one embodiment, the multifunctional or monofunctional polymerizable liquid crystal compound may be a compound represented by the following Formula 1.

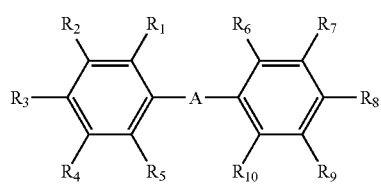

Formula 1

In Formula 1, A may be a single bond, —COO— or —OCO—, and $R_1$ to $R_{10}$ may be each independently hydrogen, a halogen, an alkyl group, an alkoxy group, an alkoxycarbonyl group, a cyano group, a nitro group, —O-Q-P or a substituent represented by the following Formula 2, a pair of two adjacent substituents among $R_1$ to $R_5$ or a pair of two adjacent substituents among $R_6$ to $R_{10}$ is joined together to form a benzene substituted with —O-Q-P, with the proviso that at least one of the $R_1$ to $R_{10}$ is —O-Q-P or a substituent of the Formula 2, or at least one pair of two adjacent substituents among $R_1$ to $R_5$ or among $R_6$ to $R_{10}$ is joined together to form a benzene substituted with —O-Q-P, where Q may be an alkylene group or an alkylidene group, and P may be a polymerizable functional group such as an alkenyl group, an epoxy group, a cyano group, a carboxyl group, an acryloyl group, a methacryloyl group, an acryloyloxy group or a methacryloyloxy group.

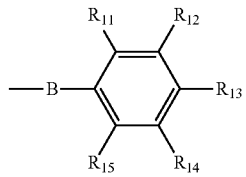

Formula 2

In Formula 2, B may be a single bond, —COO— or —OCO—, and $R_{11}$ to $R_{15}$ may be each independently hydrogen, a halogen, an alkyl group, an alkoxy group, an alkoxycarbonyl group, a cyano group, a nitro group or —O-Q-P, or a pair of two adjacent substituents among $R_{11}$ to $R_{15}$ is joined together to form a benzene substituted with —O-Q-P, with the proviso that at least one of substituents $R_{11}$ to $R_{15}$ is —O-Q-P, or two adjacent substituents among $R_{11}$ to $R_{15}$ are joined together to form a benzene substituted with —O-Q-P, where Q may be an alkylene group or an alkylidene group, and P may be a polymerizable functional group such as an alkenyl group, an epoxy group, a cyano group, a carboxyl group, an acryloyl group, a methacryloyl group, an acryloyloxy group or a methacryloyloxy group.

In Formulas 1 and 2, the term "two adjacent substituents being joined together to form a benzene substituted with —O-Q-P" may refer to the two adjacent substituents being joined together so as to form a naphthalene backbone substituted with —O-Q-P as a whole.

In Formula 2, the mark "-" indicated on the left side of the "B" may refer to the "B" being directly bound to the benzene ring of Formula 1.

In Formulas 1 and 2, the term "single bond" may mean that no atom is present in a site represented by the "A" or "B." For example, if the "A" in Formula 1 is a single bond, the benzene rings disposed on both sides of A may be directly bound to form a biphenyl structure.

In Formulas 1 and 2, the halogen may be, for example, chlorine, bromine or iodine.

Unless defined otherwise, the term "alkyl group" as used herein may refer to, for example, a linear or branched alkyl group having 1 to 20 carbon atoms, 1 to 16 carbon atoms, 1 to 12 carbon atoms, 1 to 8 carbon atoms or 1 to 4 carbon atoms, or, for example, a cycloalkyl group having 3 to 20 carbon atoms, 3 to 16 carbon atoms or 4 to 12 carbon atoms. The alkyl group may be optionally substituted with one or more substituents.

Unless defined otherwise, the term "alkoxy group" as used herein may refer to, for example, an alkoxy group having 1 to 20 carbon atoms, 1 to 16 carbon atoms, 1 to 12 carbon atoms, 1 to 8 carbon atoms or 1 to 4 carbon atoms. The alkoxy group may be linear, branched or cyclic. Also, the alkoxy group may be optionally substituted with one or more substituents.

Unless defined otherwise, the term "alkylene group or alkylidene group" may refer to, for example, an alkylene group or alkylidene group having 1 to 12 carbon atoms, 4 to 10 carbon atoms or 6 to 9 carbon atoms. The alkylene group or alkylidene group may be, for example, linear, branched or cyclic. Also, the alkylene group or alkylidene group may be optionally substituted with one or more substituents.

Unless defined otherwise, the term "alkenyl group" may refer, for example, to an alkenyl group having 2 to 20 carbon atoms, 2 to 16 carbon atoms, 2 to 12 carbon atoms, 2 to 8 carbon atoms or 2 to 4 carbon atoms. The alkenyl group may be, for example, linear, branched or cyclic. Also, the alkenyl group may be optionally substituted with one or more substituents.

In one embodiment, in Formulas 1 and 2, the "P" may be, for example, an acryloyl group, a methacryloyl group, an acryloyloxy group or a methacryloyloxy group; or, for example, an acryloyloxy group or a methacryloyloxy group. In another embodiment, the "P" may be, for example, an acryloyloxy group.

In this document, examples of the substituent that may be substituted with a certain functional group may include an alkyl group, an alkoxy group, an alkenyl group, an epoxy group, an oxo group, an oxetanyl group, a thiol group, a cyano group, a carboxyl group, an acryloyl group, a methacryloyl group, an acryloyloxy group, a methacryloyloxy group or an aryl group, but it is not limited thereto.

In one embodiment, the "—O-Q-P" or the substituent represented by the Formula 2 which may be included in at least one position selected from the group consisting of the $R_1$ to $R_{10}$ or the group consisting of the $R_{11}$ to $R_{15}$ in Formulas 1 and 2 may be, for example, included in a position of $R_3$, $R_8$ or $R_{13}$. In one embodiment, substituents that may be joined together to form a benzene ring substituted with —O-Q-P may be, for example, $R_3$ and $R_4$, or $R_{12}$ and $R_{13}$. Also, in Formulas 1 and 2, the substituents other than the —O-Q-P or the substituent of Formula 2, or the substituents other than the substituents being joined together to form the benzene ring may be, for example, hydrogen, a halogen, a linear or branched alkyl group having 1 to 4 carbon atoms, an alkoxycarbonyl group containing a linear or branched alkoxy group having 1 to 4 carbon atoms, a cycloalkyl group having 4 to 12 carbon atoms, an alkoxy group having 1 to 4 carbon atoms, a cyano group or a nitro group; or in another embodiment, they may be, for example, chlorine, a linear or branched alkyl group having 1 to 4 carbon atoms, a cycloalkyl group having 4 to 12 carbon atoms, an alkoxy group having 1 to 4 carbon atoms, an alkoxycarbonyl group containing a linear or branched alkoxy group having 1 to 4 carbon atoms, or a cyano group.

The polymerizable liquid crystal compounds may be included in the liquid crystal layer under the state where they are horizontally aligned. In one embodiment, the polymerizable liquid crystal compounds may be polymerized under the state where they are horizontally aligned. The term "being horizontally aligned" as used herein may mean that the optical axis of the liquid crystal layer including liquid crystal compounds has an inclination angle of approximately 0° to approximately 25°, approximately 0° to approximately 15°, approximately 0° to approximately 10°, approximately 0° to approximately 5°, or approximately 0° with respect to the plane of the liquid crystal layer.

In one embodiment, a difference between the refractive index of the liquid crystal layer in the in-plane slow axis direction and the refractive index of the liquid crystal layer in the in-plane fast axis direction may be from 0.05 to 0.2, from 0.07 to 0.2, from 0.09 to 0.2 or from 0.1 to 0.2. The term "refractive index of or in the in-plane slow axis direction" may refer to a refractive index in a direction in which the maximum value of the refractive index is measured in to the plane of the liquid crystal layer, and the term "refractive index of or in the in-plane fast axis direction" may refer to a refractive index in a direction in which the minimum value of the refractive index is measured in the plane of the liquid crystal layer. In general, the fast axis and slow axis in an optically anisotropic liquid crystal layer are formed to be vertical to each other. The refractive indexes may be measured with respect to light having a wavelength of 550 nm or 589 nm. The difference between the refractive indexed may be measured by using Axoscan (commercially available from Axomatrix) according to the manufacturer's manual.

The liquid crystal layer may also have a thickness of approximately 0.5 μm to 2.0 μm or approximately 0.5 μm to 1.5 μm.

The liquid crystal layer satisfying the relationship of the refractive indexes and having the thickness may express a phase retardation property suitable for applied use. In one embodiment, the liquid crystal layer satisfying the relationship of the refractive indexes and having the thickness may be suitable for use in an optical device for light division.

In one embodiment, the liquid crystal layer may be formed so that incident light, for example, light entering therein after passing through the polarizer, can be divided into two or more kinds of light having different polarization states to each other. For this purpose, the liquid crystal layer may include, for example, a first region and a second region. The first and second regions may have different phase retardation properties to each other. The term "first and second regions having different phase retardation properties to each other" as used herein may include a case where the first and second regions have optical axes formed in the same or different directions and also have different phase retardation values under the state where both of the first and second regions have the phase retardation properties; and a case where the first and second regions have optical axes formed in different directions and have the same phase retardation value. In another embodiment, the term "first and second regions having different phase retardation properties to each other" as used herein may also include a case where one of the first and second regions has a phase retardation property, and the other region is an optically isotropic region having no phase retardation property. Examples of the above case may include a case where the liquid crystal layer include a region in which the liquid crystal compounds are included, and a region in which the liquid crystal compounds are not included. The phase retardation property of the first or second region may be regulated, for example, by controlling an alignment state of the liquid crystal compound, the above refractive index relationship of the liquid crystal layer or the thickness of the liquid crystal layer.

In one embodiment, as shown in FIG. 2, the first region "A" and the second region "B" may have stripe shape extending in the same direction and may be adjacent to each other and alternately arranged. In other embodiment, as shown in FIG. 3, the first region "A" and the second region "B" may be formed in a lattice pattern and alternately arranged adjacent to each other.

In case where the optical device is used to display stereoscopic image, one of the first and second regions may be a polarization modulation region for an image signal for the left eye (hereinafter, referred to as "LC region"), and the other region may be a polarization modulation region for an image signal for the right eye (hereinafter, referred to as "RC region").

In one embodiment, the two or more kinds of light having the different polarization states, which are divided by the liquid crystal layer including the first and second regions, may include linearly polarized lights of which polarized directions are substantially vertical to each other, or include left-circularly polarized light and right-circularly polarized light.

Unless defined otherwise, the term "vertical," "horizontal," "perpendicular" or "parallel" are used when defining the angle, it means that the angle is substantially "vertical," "horizontal," "perpendicular" or "parallel." For example, the terms may include errors induced from manufacturing errors or variations. Therefore, the terms may, for example, include errors within approximately ±15 degrees, errors within approximately ±10 degrees or errors within approximately ±5 degrees.

In one embodiment, one of the first and second regions may be a region configured not to rotate the polarization axis of the light passing through it, and the other region may be a region configured to rotate the polarization axis of the light passing through it so as for the rotated axis to be perpendicular to the polarization axis of the light which has passed through the region configured not to rotate the polarization axis. In this case, the regions including the polymerizable liquid crystal compound in the liquid crystal layer may be formed only on one of the first and second regions. In the above, the regions which don't include the polymerizable liquid crystal compound may be empty space, or may be a region in which a glass or optically isotropic resin layer, resin film or resin sheet is formed.

In another embodiment, one of the first and second regions may be a region configured to convert the light passing through it into left-circularly polarized light, and the other region may be a region configured to convert the light passing through it into right-circularly polarized light. In this case, the first and second regions have optical axes formed in different directions and also have the same phase retardation value, or one of the first and second regions may be a region in which incident light may be phase-retarded by ¼ times of its wavelength, and the other region may be a region in which incident light may be phase-retarded by ¾ times of its wavelength.

In one embodiment, the first and second regions may have the same phase retardation value, for example, a value capable of phase-retarding incident light by ¼ times of its wavelength, and also have optical axes formed in different directions to each other. In the above, the optical axes formed in the different directions may form, for example, an angle of 90 degrees.

If the first and second regions have the optical axes formed in different directions, a line bisecting an angle formed by the optical axes of the first and the second regions may be formed to be vertical or horizontal with respect to the absorption axis of the polarizer.

FIG. 4 shows a schematic that can be used for explaining the optical axes arrangement of the first and second regions in case where the first and second regions "A" and "B" in FIG. 2 or 3 have optical axes formed in different directions to each other. Referring to FIG. 4, a line bisecting an angle formed by the optical axes of the first and second regions "A" and "B" may refer to a line bisecting an angle of (Θ1+Θ2). For example, if Θ1 and Θ2 are the same angle, the line bisecting an angle formed by the optical axes may be formed to be horizontal with respect to a boundary line "L" between the first and second regions "A" and "B." In the above, an angle, i.e., (Θ1+Θ2), formed by the optical axes of the first and second regions "A" and "B" may be, for example, 90 degrees.

The optical device may further include a substrate layer. The substrate layer may be formed on the side opposite to the side on which the adhesive layer is formed of the liquid crystal layer. The substrate layer may have a single-layer or multi-layer structure. FIG. 5 shows a schematic of an illustrative embodiment of the optical device 5 which further includes the substrate layer 51.

As the substrate layer, for example, a glass substrate layer or a plastic substrate layer may be used. Examples of the plastic substrate layer may include a sheet or film which includes a cellulose resin such as triacetyl cellulose (TAC) or diacetyl cellulose (DAC); a cyclo olefin polymer (COP) such as a norbornene derivative; an acrylic resin such as poly (methyl methacrylate) (PMMA); polycarbonate (PC); a poly-olefin such as polyethylene (PE) or polypropylene (PP); poly (vinyl alcohol) (PVA); poly(ether sulfone) (PES); poly (etheretherketone) (PEEK); poly(etherimide) (PED; poly (ethylene naphthalate) (PEN); a polyester such as poly (ethylene terephthalate) (PET); polyimide (PI); polysulfone (PSF); or a fluoro resin.

In one embodiment, the substrate layer such as the plastic substrate layer may have a refractive index lower than the liquid crystal layer. Example of refractive index of the substrate layer may be in a range from approximately 1.33 to approximately 1.53. If the substrate layer has a refractive index lower than the liquid crystal layer, it may be possible to enhance brightness, prevent reflection from being generated and improve contrast ratio.

The plastic substrate layer may be optically isotropic or anisotropic. If the substrate layer is optically anisotropic, the substrate layer may be arranged so as for its optical axis to be vertical or horizontal to the line bisecting an angle formed by the optical axes of the first region and the second region, as described above.

In one embodiment, the substrate layer may include a UV blocking agent or a UV ray absorbent. If the substrate layer includes the UV blocking agent or absorbent, it is possible to prevent degradation of the liquid crystal layer caused by UV rays. Examples of the UV blocking agent or absorbent may include an organic material such as a salicylic acid ester compound, a benzophenone compound, an oxybenzophenone compound, a benzotriazol compound, a cyanoacrylate compound or a benzoate compound, or an inorganic material such as zinc oxide or a nickel complex salt. The amount of the UV blocking agent or absorbent in the substrate layer is not particularly limited, and may be appropriately selected in consideration of desired effects. For example, in the manufacture of the plastic substrate layer, the UV blocking agent or absorbent may be included in a weight ratio of approximately 0.1% to 25% by weight, relative to the weight of the main raw material of the substrate layer.

A thickness of the substrate layer is not particularly limited, and may be properly regulated according to a predetermined purpose of use.

In one embodiment, the optical device may further include an alignment layer between the substrate layer and the liquid crystal layer. For example, referring to FIG. 5, the optical device 5 may further include the alignment layer as an additional layer between the substrate layer 51 and the liquid crystal layer 13. The alignment layer may align a liquid crystal compound during formation of the optical device. As the alignment layer, a conventional alignment layer known in the art, for example, an alignment layer formed by an imprinting method, a photo alignment layer or a rubbing alignment layer, may be used. In the optical device, the alignment layer is an optional element, and it is also possible to impart an aligning property to the substrate layer by directly rubbing or elongating it without using the alignment layer.

In one embodiment, a surface-treated layer may be formed on the substrate layer. FIG. 6 shows a schematic of an illustrative embodiment of the optical device 6 in which a surface-treated layer 61 is formed on a substrate layer 51. The surface-treated layer 61 may be formed on the side opposite to the side on which the liquid crystal layer 13 is formed of the substrate layer 51. The surface-treated layer may be formed on, as shown in FIG. 6, one main surface of the substrate layer or both main surfaces of the substrate layer, or may be formed on the entire surfaces including side surfaces of the substrate layer, if necessary.

Examples of the surface-treated layer may include a high-hardness layer, a glare preventing layer such as anti-glare (AG) layer or semi-glare (SG) layer, and a low-reflective layer such as anti-reflection (AR) or low-reflection (LR) layer.

The high-hardness layer may have a pencil hardness of 1H or more or 2H or more under the load of 500 g. The pencil hardness may be, for example, measured according to the ASTM D 3363 using pencil leads prescribed in KS G 2603.

In one embodiment, the high-hardness layer may be, for example, a resin layer having high hardness. The resin layer may, for example, include a cured room-temperature-curable, cured moisture-curable, cured thermocurable or cured active energy ray-curable resin composition. In one embodiment, the resin layer may include a cured thermocurable or active energy ray-curable resin composition, or a cured active energy ray-curable resin composition. In the high-hardness layer, the term "cured" may refer to a state where components included in each resin composition are subjected to a cross-linking reaction or a polymerization reaction to convert the resin composition into a hard layer. In the above, the room-temperature-curable, moisture-curable, thermocurable or active energy ray-curable resin composition may also refer to a composition whose curing may be induced at room temperature or induced in the presence of suitable moisture or by application of heat or irradiation with active energy rays.

A variety of resin compositions capable of satisfying the above ranged pencil hardness when being cured are known in the art, and a suitable resin composition may be readily selected by a person skilled in the art.

In one embodiment, the resin composition may include an acrylic compound, an epoxy compound, a urethane compound, a phenolic compound or a polyester as a main component. In the above, the term "compound" may be a monomeric, oligomeric or polymeric compound.

In one embodiment, an acrylic composition having excellent optical properties such as transparency and superior yellowing resistance, such as an active energy ray-curable acrylic composition, may be used as the composition.

The active energy ray-curable acrylic composition may, for example, include an active energy ray-polymerizable polymer component and a reactive diluting monomer.

In the above, examples of the polymer component may include a component generally known in the art as an active energy ray-polymerizable oligomer, such as urethane acrylate, epoxy acrylate, ether acrylate or ester acrylate, or a polymerized product of a mixture including a monomer such as a (meth)acrylic ester monomer. In the above, examples of the (meth)acrylic ester monomer may include alkyl (meth) acrylate, (meth)acrylate having an aromatic group, heterocyclic (meth)acrylate or alkoxy (meth)acrylate. A variety of polymer components used to prepare the active energy ray-curable composition are known in the art, and the above-described compounds may be selected, when necessary.

The reactive diluting monomer that may be included in the active energy ray-curable acrylic composition may be a monomer having one or two or more active energy ray-curable functional groups, such as acryloyl groups or methacryloyl groups. The (meth)acrylic ester monomer or multifunctional acrylates may be, for example, used as the reactive diluting monomer.

The kinds of the components and a mixing ratio of the components used to prepare the active energy ray-curable acrylic composition are not particularly limited, and may be adjusted in consideration of desired hardness and other physical properties of the resin layer.

In one embodiment, as the glare preventing layer such as the AG or SG layer, for example, a resin layer having an uneven surface formed thereon or a resin layer including particles may be used. In the above, the particles included in the resin layer may have a different refractive index from the resin layer.

The resin layer used for formation of the high-hardness layer may be, for example, used as the resin layer of the glare preventing layer. If the glare preventing layer is formed, the components of the composition may not necessarily be adjusted so that the resin layer can show high hardness, but the resin layer may be formed so that it can show the high hardness.

A method of forming the uneven surface on a resin layer is not particularly limited. For example, the uneven structure may be realized by curing the composition under the state where a coating layer of the composition is in contact with a mold having a predetermined uneven structure, or by mixing particles having proper particle sizes with the composition and then coating and curing the composition.

The glare preventing layer may also be formed using particles having a different refractive index from the resin layer.

In one embodiment, the particles may have a difference in refractive index from the resin layer of 0.03 or less or 0.02 to 0.2. If the difference in refractive index is extremely small, it is difficult to induce haze, whereas, if the difference in refractive index is extremely high, scattering in the resin layer may often cause an increase in haze, and light transmittance or contrast characteristics may be degraded. Therefore, suitable particles may be selected in consideration of the above.

The shape of the particles included in the resin layer is not particularly limited, but may for example be a spherical, oval, polyhedral, amorphous or other shape. The particles may have an average diameter of 50 nm to 5,000 nm. In one embodiment, particles having an uneven surface formed thereon may be used. Such particles may for example have an average surface roughness (Rz) of 10 nm to 50 nm or 20 nm to 40 nm, and/or a maximum height of protrusions formed on the particle surfaces may be in a range of approximately 100 nm to 500 nm or 200 nm to 400 nm, and an interval between the protrusions may be in a range of 400 nm to 1,200 nm or 600 nm to 1,000 nm. Such particles are highly compatible with the resin layer, and show excellent dispersibility in the resin layer.

Examples of the particles may include various inorganic or organic particles. Examples of the inorganic particles may include silica, amorphous titania, amorphous zirconia, indium oxide, alumina, amorphous zinc oxide, amorphous cerium oxide, barium oxide, calcium carbonate, amorphous barium titanate or barium sulfate, and examples of the organic particles may include particles including a cross-linked or uncross-linked product of an organic material such as an acrylic resin, a styrene resin, a urethane resin, a melamine resin, a benzoguanamine resin, an epoxy resin or a silicone resin, but it is not limited thereto.

Neither the shape of the uneven structure on the resin layer nor the amount of the particles is particularly limited. For example, in the case of the AG layer, the shape of the uneven structure or the amount of the particles may be adjusted so that a haze value of the resin layer may be in a range of approximately 5% to 15%, 7% to 13%, or approximately 10%, and, in the case of the SG layer, they may be adjusted so that a haze value of the resin layer may be in a range of approximately 1% to 3%. The haze value may be measured according to the manufacturer's manual using a hazemeter such as HR-100 or HM-150 (commercially available from SEPUNG).

The low reflective layer such as AR or LR layer may be formed by coating a low refractive index material. Low refractive index materials which may be used to form the low reflective layer are widely known in the art. All the low refractive index materials may be properly selected and used in the optical device. The low reflective layer may be formed through coating of the low refractive index material so that the reflective rate can be approximately 1% or less.

In one embodiment, in order to form the surface-treated layer, for example, materials disclosed in Korean Patent Publication Nos. 2007-0101001, 2011-0095464, 2011-0095004, 2011-0095820, 2000-0019116, 2000-0009647, 2000-0018983, 2003-0068335, 2002-0066505, 2002-0008267, 2001-0111362, 2004-0083916, 2004-0085484, 2008-0005722, 2008-0063107, 2008-0101801 or 2009-0049557 may also be used.

The surface-treated layer may be formed either alone or in combination with another. Examples of the combination may include a case where the high-hardness layer is formed on the substrate layer and then the low-reflective layer is formed on the high-hardness layer.

In the optical device, the polarizer and the liquid crystal layer may be attached to each other by an adhesive layer. The adhesive layer may have a glass transition temperature of 36° C. or more, 37° C. or more, 38° C. or more, 39° C. or more, 40° C. or more, 50° C. or more, 60° C. or more, 70° C. or more, 80° C. or more, or 90° C. or more. An optical device having excellent durability may be provided by attaching the polarizer to the liquid crystal layer using the adhesive layer having the glass transition temperature within the above range. Also, the adhesive layer may serve to stably maintain a phase retardation property of the liquid crystal layer. The upper limit of the glass transition temperature is not particularly limited, but may be, for example, approximately 200° C., approximately 150° C., or approximately 120° C.

The adhesive may have a thickness of 6 μm or less, 5 μm or less or 4 μm or less. The durability, for example, an adhesive property to the liquid crystal layer and a phase retardation property of the liquid crystal layer, may be suitably maintained within this thickness. In the above, the lower limit of the thickness of the adhesive may be, for example, 0.1 μm, 0.3 μm or 0.5 μm.

In one embodiment, the adhesive layer may include an active energy ray-curable adhesive. That is, the adhesive may include an adhesive composition cured by irradiation with active energy rays. The term "curing of an adhesive composition" as used herein may refer to a process of inducing a physical or chemical action or reaction of a component in the composition so as to express an adhesive property. In the above, the term "active energy ray-curable composition" may refer to a kind of an adhesive or an adhesive composition whose curing may be induced by irradiation with active energy rays. In the above, the "active energy rays" may include particle beams such as alpha-particle beams, proton beams, neutron beams or electron beams, as well as microwaves, infrared rays (IR), UV rays (UV), X rays and gamma rays. In general, the UV rays or electron beams may be used.

The adhesive may include a radically polymerizable compound or a cationically polymerizable compound. In one embodiment, the polymerizable compound may be included in a polymerized form in the adhesive layer. In the above, the "radically polymerizable compound" may refer to a compound that may be polymerized by a radical reaction, for example a radical reaction induced by the irradiation with active energy rays to form an adhesive, and the "cationically polymerizable compound" may refer to a compound that may be polymerized by a cationic reaction, for example a cationic reaction induced by the irradiation with active energy rays to form an adhesive. Each of the compounds may be included in the adhesive composition, and may form an adhesive by being cured.

The adhesive composition may include either a radically polymerizable compound or a cationically polymerizable compound, or include both of the radically polymerizable compound or the cationically polymerizable compound.

Examples of the cationically polymerizable compound may include an epoxy compound, a vinyl ether compound, an oxetane compound, an oxolane compound, a cyclic acetal compound, a cyclic lactone compound, a thiirane compound, a thiovinylether compound, a spirortho ester compound, an ethylenically unsaturated compound, a cyclic ether compound or a cyclic thioether compound. In one embodiment, an epoxy compound may be used as the cationically polymerizable compound.

Examples of the cationically polymerizable epoxy compound may include an epoxy resin, an alicyclic epoxy compound, an aliphatic epoxy compound or an aromatic epoxy compound.

In the above, examples of the epoxy resin may include a cresol novolac epoxy resin or a phenol novolac epoxy resin. The epoxy resin may have a weight average molecular weight ($M_w$) of 1,000 to 5,000 or 2,000 to 4,000. The term "weight average molecular weight" as used herein may refer to a converted value with respect to standard polystyrene, which may be measured by Gel Permeation Chromatograph (GPC). Unless defined otherwise, the term "molecular weight" may mean the "weight average molecular weight." A polymer having a molecular weight of 1,000 or more may be used to properly maintain the durability of an adhesive layer, and a polymer having a molecular weight of 5,000 or less may also be used to maintain the workability such as a coating property of a composition.

The term "alicyclic epoxy compound" as used herein may refer to a compound including at least one alicyclic epoxy group. The term "alicyclic epoxy group" as used herein may refer to a functional group having an aliphatic saturated hydrocarbon ring, and two carbon atoms among the carbon atoms constituting the hydrocarbon ring also constitute an epoxy group.

Examples of the alicyclic epoxy compound may include an epoxycyclohexylmethyl epoxycyclohexanecarboxylate compound; an epoxycyclohexane carboxylate compound of alkanediol; an epoxycyclohexylmethyl ester compound of dicarboxylic acid; an epoxycyclohexylmethyl ether compound of polyethyleneglycol; an epoxycyclohexylmethyl ether compound of alkanediol; a diepoxytrispiro compound; a diepoxymonospiro compound; a vinylcyclohexene diepoxide compound; an epoxycyclopentyl ether compound; or a diepoxy tricyclo decane compound. Specifically, the alicyclic epoxy compound that may be used herein may include an esterification product of 7-oxabicyclo[4,1,0]heptane-3-carboxylic acid and (7-oxa-bicyclo[4,1,0]hepto-3-yl)methanol; an esterification product of 4-methyl-7-oxabicyclo[4,1,0] heptane-3-carboxylic acid and (4-methyl-7-oxa-bicyclo[4,1,0]hepto-3-yl)methanol; an esterification product of 7-oxabicyclo[4,1,0]heptane-3-carboxylic acid and 1,2-ethanediol; an esterification product of (7-oxabicyclo[4,1,0]hepto-3-yl)methanol and adipic acid; an esterification product of (4-methyl-7-oxabicyclo[4,1,0]hepto-3-yl)methanol and adipic acid; or an etherification product of (7-oxabicyclo[4,1,0]hepto-3-yl)methanol and 1,2-ethanediol.

In one embodiment, a difunctional epoxy compound, i.e., a compound having two epoxy groups may be used as the alicyclic epoxy compound, and a compound in which both of the two epoxy groups are alicyclic epoxy groups may be used.

The aliphatic epoxy compound may be an epoxy compound having at least one aliphatic epoxy group that is not the alicyclic epoxy group. Examples of the aliphatic epoxy compound may include polyglycidyl ether of aliphatic polyvalent alcohol; a polyglycidyl ether of an alkyleneoxide addition product of aliphatic polyvalent alcohol; a polyglycidyl ether of polyester polyol of aliphatic polyvalent alcohol and aliphatic polyvalent carboxylic acid; a polyglycidyl ether of aliphatic polyvalent carboxylic acid; a polyglycidyl ether of polyester polycarboxylic acid of aliphatic polyvalent alcohol and aliphatic polyvalent carboxylic acid; a dimer, oligomer or polymer obtained by vinyl polymerization of glycidyl acrylate or glycidyl methacrylate; or an oligomer or polymer obtained by vinyl polymerization of the glycidyl acrylate or glycidyl methacrylate and other vinyl monomer. In one embodiment, polyglycidyl ether of an aliphatic polyvalent alcohol or an alkyleneoxide addition product of the polyvalent alcohol may be used, but it is not limited thereto.

In the above, the aliphatic polyvalent alcohol may, for example, be an aliphatic polyvalent alcohol having 2 to 20 carbon atoms, 2 to 16 carbon atoms, 2 to 12 carbon atoms, 2 to 8 carbon atoms or 2 to 4 carbon atoms. For example, the aliphatic polyvalent alcohol may include an aliphatic diol such as ethyleneglycol, 1,2-propanediol, 1,3-propanediol, 2-methyl-1,3-propanediol, 2-butyl-2-ethyl-1,3-propanediol, 1,4-butanediol, neopentylglycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, or 1,10-decanediol; an alicyclic diol such as cyclohexanedimethanol, cyclohexanediol, hydrogenated bisphenol A, or hydrogenated bisphenol F; trimethylolethane, trimethylolpropane, a hexitol, a pentitol, glycerin, polyglycerin, pentaerythritol, dipentaerythritol, or tetramethylolpropane.

In the above, the alkyleneoxide may also be an alkyleneoxide having 1 to 20 carbon atoms, 1 to 16 carbon atoms, 1 to 12 carbon atoms, 1 to 8 carbon atoms or 1 to 4 carbon atoms. For example, ethyleneoxide, propyleneoxide or butyleneoxide may be used herein.

In the above, examples of the aliphatic polyvalent carboxylic acid may also include oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, 1,20-eicosamethylenedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 1,4-dicarboxylic acid methylenecyclohexane, 1,2,3-propanetricarboxylic acid, 1,2,3,4-butanetetracarboxylic acid, or 1,2,3,4-cyclobutanetetracarboxylic acid, but it is not limited thereto.

In one embodiment, a compound that does not include the alicyclic epoxy group and that includes at least three epoxy groups, or three epoxy groups, may be used as the aliphatic epoxy compound when considering a curing property, weather resistance and refractive index characteristics, but it is not limited thereto.

Examples of the aromatic epoxy compound that may be used herein may include an epoxy compound containing an aromatic group in the molecule, for example, a bisphenol-type epoxy resin such as bisphenol A epoxy, bisphenol F epoxy, bisphenol S epoxy or brominated bisphenol epoxy; a novolac-type epoxy resin such as phenol novolac epoxy resin or cresol novolac epoxy resin; a cresol epoxy resin or a resorcinol glycidyl ether.

As the cationically polymerizable compound, for example, a silane compound having a cationically polymerizable functional group may also be used. The silane compound may control a surface energy of an adhesive layer so as to improve an adhesion strength. As the silane compound, for example, a compound represented by the following Formula 3 may be used.

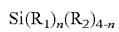

$$Si(R_1)_n(R_2)_{4-n} \quad \text{Formula 3}$$

In Formula 3, $R_1$ is a cationically polymerizable functional group bound to the silicon atom, $R_2$ is a functional group bound to the silicon atom, and is, for example, hydrogen, a hydroxyl group, an alkyl group or an alkoxy group, and n is a number ranging from 1 to 4.

Examples of the cationically polymerizable functional group may include an alkenyl group such as vinyl group, a vinyloxy group or a cyclic ether group such as a glycidyl group or an oxetanyl group, or a functional group including the cyclic ether group, alkenyl group or vinyloxy group.

In Formula 3, for example, n may be, for example, 1 or 2.

In one embodiment, an oligomeric silane compound that is a silicon resin which has a relatively low molecular weight and of which both ends of a molecular chain are blocked by alkoxysilyl groups and to which the cationically polymerizable functional group is introduced may also be used as the silane compound.

A compound which has a radically polymerizable functional group such as an acryloyl group or a methacryloyl group and may be polymerized to form an adhesive may be used as the radically polymerizable compound.

In one embodiment, the radically polymerizable compound may be an acrylamide compound. The acrylamide compound may be represented by the following Formula 4.

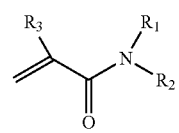

Formula 4

In Formula 4, $R_1$ and $R_2$ are each independently hydrogen, an alkyl group or a hydroxyalkyl group, or $R_1$ and $R_2$ are joined together to form a heterocyclic structure including a nitrogen atom, and $R_3$ is hydrogen or an alkyl group.

Unless defined otherwise, the term "heterocyclic structure" as used herein may refer to a structure of cyclic compound having at least two different kinds of atoms as ring-membered atoms. In Formula 4, the heterocyclic structure may include 3 to 20, 3 to 16, 3 to 12 or 3 to 8 ring-membered atoms, including the nitrogen atom in Formula 4 to which $R_1$ and $R_2$ are linked. In addition to the nitrogen atom, an atom that may be included in the heterocyclic structure may include carbon, oxygen or sulfur. Also, the heterocyclic structure may include an additional nitrogen atom in addition to the nitrogen atom in Formula 4 to which $R_1$ and $R_2$ are linked as long as the heterocyclic structure is formed. The heterocyclic structure may have no unsaturated bond such as a carbon-carbon double bond, or may have at least one unsaturated bond, if necessary. Also, the heterocyclic structure may be optionally substituted with at least one substituent.

Examples of the compound of Formula 4 may include (meth)acrylamide, N-alkyl acrylamide, N-hydroxyalkyl (meth)acrylamide or N-acryloyl morpholine, but it is not limited thereto.

The radically polymerizable compound may also be a compound including a heterocyclic acetal structure. The term "heterocyclic acetal structure" as used herein may refer to a heterocyclic structure including a structure in which two oxygen atoms are bound to the same carbon atom through a single bond. That is, the compound may be a compound including both of the functional group having a heterocyclic acetal structure and the radically polymerizable functional group. For example, the compound may serve as a diluent to regulate the viscosity of a composition, and may also be used to improve an adhesion strength to the liquid crystal layer.

The heterocyclic acetal structure may have 4 to 20, 4 to 16, 4 to 12 or 4 to 8 ring-membered atoms, and may be optionally substituted with at least one substituent.

In one embodiment, the heterocyclic acetal structure may be represented by the following Formula 5 or 6. Therefore, the radically polymerizable compound may include a monovalent residue derived from the compound of the following Formula 5 or 6 along with the radically polymerizable functional group.

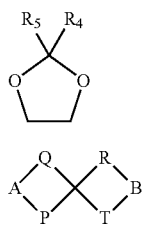

Formula 5

Formula 6

In Formula 5 or 6, $R_4$ and $R_5$ each independently represent hydrogen or an alkyl group, Q, P, R and T are each independently a carbon atom or an oxygen atom, provided that two of Q, P, R and T are oxygen atoms, and A and B each independently represent an alkylene or alkylidene group having 1 to 5 carbon atoms.

In one embodiment, the radically polymerizable compound having the heterocyclic acetal structure may be a compound represented by the following Formula 7.

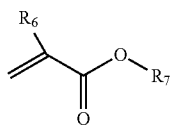

Formula 7

In Formula 7, $R_6$ represents hydrogen or an alkyl group, and $R_7$ is a monovalent residue derived from the compound of Formula 5 or 6, or an alkyl group substituted with the monovalent residue.

Examples of the compound represented by Formula 7 may include (2-ethyl-2-methyl-1,3-dioxolane-4-yl)methyl acrylate, (2-isobutyl-2-methyl-1,3-dioxolane-4-yl)methyl acrylate or (1,4-dioxaspiro[4,5]dec-2-yl)methyl acrylate, but it is not limited thereto.

In one embodiment, the radically polymerizable compound may be a monomer represented by one of Formulas 8 to 10.

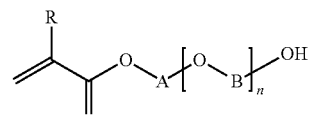

Formula 8

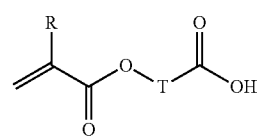

Formula 9

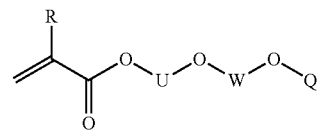

Formula 10

In Formulas 8 to 10, R is hydrogen or an alkyl group, A, B, T, U and W are each independently an alkylene group or an alkylidene group, Q is an alkyl group or an aryl group, and n is an integer ranging from 0 to 5.

Unless defined otherwise, the term "aryl group" as used herein may refer to a monovalent residue derived from a compound or a derivative thereof, which includes a benzene ring or a structure in which two or more benzene rings are condensed or joined together. The aryl group may be, for example, an aryl group having 6 to 22 carbon atoms, 6 to 16 carbon atoms, or 6 to 13 carbon atoms, such as a phenyl group, a phenylethyl group, a phenylpropyl group, a benzyl group, a tolyl group, a xylyl group or a naphthyl group.

In Formula 8, the "n" may be, for example, in a range of 0 to 3, or in a range of 0 to 2. Examples of the compound of Formula 8 may include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate, but it is not limited thereto.

In Formula 9, the "T" may be, for example, an alkylene group having 1 to 4 carbon atoms. The compound of Formula 9 may include, for example, β-carboxyethyl (meth)acrylate. In Formula 10, the "Q" may be an alkyl group having 1 to 4 carbon atoms, and the "U" and "W" may each independently be an alkylene group having 1 to 4 carbon atoms. Such a compound may include 2-(2-ethoxyethoxy)ethyl (meth)acrylate, but it is not limited thereto.

In one embodiment, the radically polymerizable compound may be a compound represented by the following Formula 11. For example, such a compound may be used to improve the durability of an adhesive.

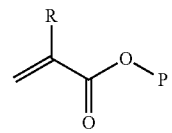

Formula 11

In Formula 11, R is hydrogen or an alkyl group, and P is a monovalent residue derived from an aliphatic saturated cyclic hydrocarbon compound.

In Formula 11, the monovalent residue may refer to a monovalent residue that is induced from an aliphatic saturated cyclic hydrocarbon compound, for example, a compound in which a carbon atom is bound to form a ring structure and which is not an aromatic compound, or a derivative thereof. The aliphatic saturated cyclic hydrocarbon compound may, for example, have 3 to 20 carbon atoms, 6 to 15 carbon atoms, or 8 to 12 carbon atoms. Examples of the monovalent residue may include an isobornyl group, a cyclohexyl group, a norbornanyl group, a norbornenyl group, a dicyclopentadienyl group, ethynylcyclohexane group, an ethynylcyclohexene group or an ethynyldecahydronaphthalene group. In one embodiment, an isobornyl group may be used, but it is not limited thereto.

In one embodiment, an isocyanate-functional acrylic ester compound may also be used as the radically polymerizable compound. As the isocyanate-functional acrylic ester compound, any compound can be used as long as it has both of an isocyanate group and an acryl group. For example, an isocyanate-functional aliphatic acrylic ester compound may be used herein. In one embodiment, a compound represented by the following Formula 12 may be used.

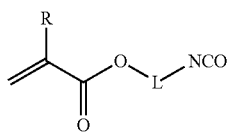

Formula 12

In Formula 12, R represents hydrogen or an alkyl group, and L represents a divalent hydrocarbon group.

In Formula 12, a divalent aliphatic hydrocarbon group may be, for example, used as the divalent hydrocarbon group. Specifically, a divalent aliphatic hydrocarbon group having 1 to 20 carbon atoms, 1 to 16 carbon atoms, 1 to 12 carbon atoms, 1 to 8 carbon atoms or 1 to 4 carbon atoms may be used. For example, the hydrocarbon group may include a linear, branched or cyclic alkylene; a linear, branched or cyclic alkenylene group; or a linear, branched or cyclic alkynylene group. In one embodiment, the hydrocarbon group may be a linear or branched alkylene or alkynylene group having 1 to 8 carbon atoms.

Examples of the compound may include (meth)acryloyloxyalkyl isocyanate, more particularly (meth)acryloyloxy ($C_{1-8}$)alkyl isocyanate, more particularly (meth)acryloyloxy ($C_{1-4}$)alkyl isocyanate, and further particularly (meth)acryloyloxy ethyl isocayanate, but it is not limited thereto. In the above, the term "($C_{1-8}$)alkyl" may refer to a linear, branched or cyclic alkyl having 1, 2, 3, 4, 5, 6, 7 or 8 carbon atoms, and the term "($C_{1-4}$)alkyl" may refer to a linear, branched or cyclic alkyl having 1, 2, 3 or 4 carbon atoms.

In one embodiment, a compound represented by the following Formula 13 may be used as the isocyanate-functional acrylic ester compound.

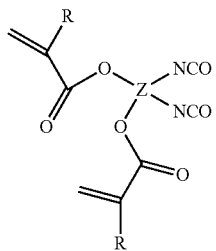

Formula 13

In Formula 13, R represents hydrogen or an alkyl group, and Z represents a tetravalent hydrocarbon group.

In the above, a tetravalent aliphatic hydrocarbon group may be, for example, used as the tetravalent hydrocarbon group. Specifically, a tetravalent aliphatic hydrocarbon group having 1 to 20 carbon atoms, 1 to 16 carbon atoms, 1 to 12 carbon atoms, 1 to 8 carbon atoms or 1 to 4 carbon atoms may be used. For example, a tetravalent hydrocarbon derived from a linear, branched or cyclic alkane; a linear, branched or cyclic alkene; or a linear, branched or cyclic alkyne may be used. The hydrocarbon group may be, for example, a tetravalent hydrocarbon derived from a linear or branched alkane group having 1 to 8 carbon atoms.

Examples of the compound may include a compound commercially available as Laromer LR9000 from BASF.

In one embodiment, a compound having a heterocyclic residue such as tetrahydrofurfuryl(meth)acrylate or (meth)acryloyl morpholine may be used as the radically polymerizable compound.

In one embodiment, the adhesive usable herein may include an adhesive including a cationically curable adhesive composition that includes, as cationically polymerizable compounds, an alicyclic and/or aliphatic epoxy compound, as a main component and optionally an oxetane compound or a silane compound having the cationically polymerizable functional group as a diluent or an additive; a radically curable adhesive composition that includes, as radically polymerizable compounds, the acrylamide compound as a main component and optionally another radically polymerizable compound as an additive; an adhesive composition that includes, as radically polymerizable compounds, a compound represented by one of Formulas 8 to 10 as a main component and optionally another radically polymerizable compound; or a hybrid curable adhesive composition that includes the epoxy resin, or a mixture of the alicyclic epoxy compound and the aliphatic epoxy compound along with a radically polymerizable compound represented by one of Formulas 8 to 10, but it is not limited thereto. The adhesive composition may be included in the adhesive in a cured state.

The respective components in the adhesive composition and a mixing ratio of the components may be properly selected in consideration of the glass transition temperature and the like.

The adhesive composition forming an adhesive may further include a polymerization initiator. The kind of the polymerization initiator may be properly selected according to the components included in the adhesive composition. For example, a cationic polymerization initiator and/or a radical polymerization initiator may be used herein.

For example, as the radical polymerization initiator, an initiator such as a benzoin compound, a hydroxyketone compound, an aminoketone compound or a phosphine oxide compound may be used, and, in one embodiment, a phosphine oxide compound may be used. Specifically, examples of the radical polymerization initiator may include benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexylphenylketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone], bis(2,4,6-trimethylbenzoyl)-phenyl-phosphine oxide and 2,4,6-trimethylbenzoyl-diphenyl-phosphine oxide, but it is not limited thereto.

As the cationic polymerization initiator, an initiator capable of releasing a component capable of initiating cationic polymerization by irradiation with active energy rays, for example, an ionized cationic initiator such as an onium salt or an organometallic salt, or a non-ionized cationic initiator such as organic silane or latent sulfonic acid, or other non-ionized compound may be used.

If necessary, the adhesive composition may further include one or more additives such as a thermal curing agent, a catalyst, a UV curing agent, a low molecular material, a silane coupling agent, a scattering agent, a UV stabilizer, a toning agent, a reinforcing agent, a filler, an antifoaming agent, a surfactant, a photosensitizer and a plasticizer.

In the optical device, the liquid crystal layer and the polarizer may be directly attached to each other by the adhesive layer, or they may be attached to each other by positioning a primer layer between the polarizer and the adhesive layer or between the liquid crystal layer and the adhesive layer, if necessary. For example, in case of the optical device 1 in FIG. 1, the primer layer may be formed between the polarizer 11 and the adhesive layer 12 or between the liquid crystal layer 13 and the adhesive layer 12. In this case, the kind of the primer layer is not particularly limited, and various kinds of primer layers used to improve an adhesive property may be generally used herein.

In one embodiment, the optical device may further include a protective layer. The protective layer may be formed on the upper side of the polarizer. FIG. 7 shows a schematic of an illustrative embodiment of the optical device 7 which further includes the protective layer 71 on the upper side of the polarizer 11. For example, the protective layer may be a cellulose resin film such as a triacetyl cellulose (TAC) film; a polyester film such as a poly(ethylene terephthalate) (PET) film; a polycarbonate (PC) film; a poly(ether sulfone) (PES) film; an acrylic film; a polyolefin film such as a polyethylene (PE), polypropylene (PP) or cyclic olefin polymer film; or a resin layer that is cured to form a hard layer, but it is not limited thereto.

In one embodiment, the optical device may further include a phase retardation layer. The phase retardation layer may be arranged on one side of the polarizer. The phase retardation layer may be a ¼-wavelength phase retardation layer or a ½-wavelength phase retardation layer. The term "¼- or ½-wavelength phase retardation layer" as used herein may refer to a phase retardation element capable of phase-retarding incident light by ¼ times or ½ times of its wavelength. FIG. 8 shows a schematic of an illustrative embodiment of the optical device 8 which further includes the phase retardation layer 81 attached on the upper side of the polarizer 11. For example, the optical device of the above structure may be effectively used as a device applied to an organic light emitting diode (OLED) to give a light division function and an anti-reflection function. As the phase retardation layer, for example, a polymer film to which a birefringence property is imparted by, for example, an elongation process or a liquid crystal layer formed by polymerizing a polymerizable liquid crystal compound may be used.

In one embodiment, the optical device may further include a pressure-sensitive adhesive layer. The pressure-sensitive adhesive layer may be formed on one side of the polarizer. For example, the pressure-sensitive adhesive layer may be formed on the side opposite to the side on which the adhesive layer is formed of the polarizer. For example, the pressure-sensitive adhesive layer may be used to attach the optical device to an optical instrument such as a liquid crystal panel of a liquid crystal display device or an image display element of a stereoscopic image display device. FIG. 9 shows a schematic of an illustrative embodiment of the optical device 9 in which a pressure-sensitive adhesive layer 91 is formed on the upper side of the polarizer 11.

The pressure-sensitive adhesive layer may have a storage modulus at 25° C. of 0.02 MPa or more, 0.03 MPa or more, 0.04 MPa or more, 0.05 MPa or more, 0.06 MPa or more, 0.07 MPa or more, 0.08 MPa or more, greater than 0.08 MPa, or 0.09 MPa or more. The upper limit of the storage modulus is not particularly limited. For example, the storage modulus may be 0.25 MPa or less, 0.2 MPa or less, 0.16 MPa or less, 0.1 MPa or less, or 0.08 MPa or less.

If the pressure-sensitive adhesive layer has the storage modulus within the above range, the optical device may show excellent durability, and thus show a stable light division property since the phase retardation property of the phase retardation layer is, for example, stably maintained for a long period of time even under the severe conditions. Also, it is possible to prevent side effects such as light leakage in optical instruments using the optical device. In addition, the optical device may show excellent resistance to an external pressure or scratch due to its improved hardness property, and also show excellent reworkability.

The pressure-sensitive adhesive layer may have a thickness of 25 μm or less, 20 μm or less, or 18 μm or less. If the pressure-sensitive adhesive layer has the thickness within the above range, the durability, hardness property and reworkability may be further improved. If the pressure-sensitive adhesive layer becomes thinner, the pressure-sensitive adhesive may show more excellent physical properties, and therefore the lower limit of the thickness is not particularly limited. For example, the thickness of the pressure-sensitive adhesive layers may be, for example, adjusted within a range of approximately 1 μm or more, or approximately 5 μm or more in consideration of processability.

The pressure-sensitive adhesive layer may include an acrylic pressure-sensitive adhesive, a silicon pressure-sensitive adhesive, an epoxy pressure-sensitive adhesive or a rubber pressure-sensitive adhesive.

If the pressure-sensitive adhesive layer includes the acrylic pressure-sensitive adhesive, the pressure-sensitive adhesive may be, for example, formed by curing a pressure-sensitive adhesive composition that includes a thermocurable component, an active energy ray-curable component, or both of the thermocurable component and the active energy ray-curable component.

The term "curing of a pressure sensitive adhesive composition" as used herein may refer to a change in a chemical or physical state of a pressure-sensitive adhesive composition in order to express a pressure-sensitive adhesive property. In the above, the term "thermocurable component" and "active energy ray-curable component" may refer to a component whose curing is induced by application of suitable heat or irradiation of active energy rays, respectively.

The pressure-sensitive adhesive layer formed from the composition including the thermocurable component may include an acrylic polymer that is cross-linked by a multifunctional cross-linking agent.

In one embodiment, an acrylic polymer having a weight average molecular weight of 500,000 or more may be used as the acrylic polymer cross-linked by the multifunctional cross-linking agent. If the polymer has a molecular weight of 500,000 or more, it is possible to form a pressure-sensitive adhesive layer having excellent durability even under severe conditions. The upper limit of the molecular weight is not particularly limited, but the molecular weight of the acrylic polymer may be, for example, adjusted within 2,500,000 or less in consideration of the durability or a coating property of a composition.

In one embodiment, the acrylic polymer may be a polymer include a (meth)acrylic ester monomer and a cross-linkable monomer as polymerized units.

As the (meth)acrylic ester monomer, for example, alkyl (meth)acrylate may be used. For instance, alkyl (meth)acrylate that includes an alkyl group having 1 to 20 carbon atoms may be used in consideration of the cohesion, glass transition temperature or pressure-sensitive adhesivity of the pressure-sensitive adhesive. Examples of such a monomer may include methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate and tetradecyl (meth)acrylate, which may be used alone or in combination with the other.

The polymer may further include the cross-linkable monomer as a polymerized unit. For example, the polymer may include 80 to 99.9 parts by weight of the polymerized (meth)acrylic ester monomer and 0.1 to 20 parts by weight of the polymerized cross-linkable monomer. The term "cross-linkable monomer" as used herein may refer to a monomer that can be copolymerized with another monomer used to form the acrylic polymer and provide a cross-linkable functional group to the polymer after the copolymerization. The cross-linkable functional group may react with the multifunctional cross-linking agent as will be described later to form a cross-linking structure.

Examples of the cross-linkable functional group may include a hydroxyl group, a carboxyl group, an epoxy group, an isocyanate group or a nitrogen-containing functional group such as an amino group. Copolymerizable monomers which can provide the cross-linkable functional group during the manufacture of the pressure-sensitive adhesive resin are widely known in the art. Examples of the cross-linkable monomer may include, but are not limited to, a hydroxyl group-containing monomer such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate; a carboxyl group-containing monomer such as (meth)acrylic acid, 2-(meth)acryloyloxy acetic acid, 3-(meth)acryloyloxy propylic acid, 4-(meth)acryloyloxy butyric acid, an acrylic acid dimer, itaconic acid, maleic acid and maleic anhydride, or a nitrogen-containing monomer such as (meth)acrylamide, N-vinyl pyrrolidinone or N-vinyl caprolactam, which may be used alone or in combination.

The acrylic polymer may include various other monomers as a polymerized unit, if necessary. Examples of the other monomers may include a nitrogen-containing monomer such as (meth)acrylonitrile, (meth)acrylamide, N-methyl (meth)acrylamide or N-butoxy methyl (meth)acrylamide; a styrene-based monomer such as styrene or methyl styrene; glycidyl (meth)acrylate; or a carboxylic acid vinyl ester such as vinyl acetate. Such additional monomers may be used in a weight ratio of 20 parts by weight or less, relative to the total weight of the other monomers.

The acrylic polymer may be prepared by subjecting a monomer mixture obtained by appropriately selecting and mixing the components as described above to a polymerization such as solution polymerization, photopolymerization, bulk polymerization, suspension polymerization or emulsion polymerization.

Examples of the multifunctional cross-linking agent capable of cross-linking the acrylic polymer may include conventional thermocurable cross-linking agents such as an isocyanate cross-linking agent, an epoxy cross-linking agent, an aziridine cross-linking agent and a metal chelate cross-linking agent. In the above, examples of the isocyanate cross-linking agent may include a multifunctional isocyanate compound such as tolylene diisocyanate, xylene diisocyanate, diphenylmethane diisocyanate, hexamethylene diisocyanate, isophrone diisocyanate, tetramethylxylene diisocyanate or naphthalene diisocyanate, or a compound obtained by reacting the multifunctional isocyanate compound with a polyol compound such as trimethylol propane. Examples of the epoxy cross-linking agent may include at least one selected from the group consisting of ethyleneglycol diglycidyl ether, triglycidyl ether, trimethylolpropane triglycidyl ether, N,N,N',N'-tetraglycidyl ethylenediamine and glycerin diglycidyl ether, examples of the aziridine cross-linking agent may include at least one selected from the group consisting of N,N'-toluene-2,4-bis(1-aziridine-carboxamide), N,N'-diphenylmethane-4,4'-bis(1-aziridine-carboxamide), triethylene melamine, bisisoprotaloyl-1-(2-methylaziridine) and tri-1-aziridinylphosphine oxide, and examples of the metal chelate cross-linking agent may include compounds obtained by coordinating a polyvalent metal such as aluminum, iron, zinc, tin, titanium, antimony, magnesium or vanadium with acetylacetone or ethyl acetoacetate, but it is not limited thereto.

The composition that includes the thermocurable component or the pressure-sensitive adhesive layer formed therefrom may include, for example, the multifunctional cross-linking agent in an amount of 0.01 to 10 parts by weight or 0.01 to 5 parts by weight, relative to 100 parts by weight of the acrylic polymer. If the weight ratio of the cross-linking agent is controlled to be 0.01 parts by weight or more, it is possible to effectively maintain cohesion of a pressure-sensitive adhesive, and if the weight ratio of the cross-linking agent is controlled to be 10 parts by weight or less, it is possible to prevent interlayer detachment or delamination from being caused in the adhesive interface and maintain excellent durability. However, the weight ratio may be varied according to desired properties such as elastic modulus or the presence of other cross-linking structures in the pressure-sensitive adhesive layer.

The pressure-sensitive adhesive layer formed of the composition including the active energy ray-curable component may include a cross-linked structure including a polymerized active energy ray-polymerizable compound. The pressure-sensitive adhesive layer may be, for example, formed by mixing a compound including at least one functional group capable of being polymerized by being irradiated with active energy rays, such as, for example, an alkenyl group, an acryloyl group, a methacryloyl group, an acryloyloxy group or a methacryloyloxy group in the pressure-sensitive adhesive composition, and cross-linking and/or polymerizing the component by irradiating the composition with active energy rays. In the above, examples of the compound including the functional group capable of being polymerized by being irradiated with the active energy rays may include a polymer obtained by introducing a functional group such as an acryloyl group, a methacryloyl group, an acryloyloxy group or a methacryloyloxy group into a side chain of the acrylic polymer; a compound known as a so-called active energy ray-curable oligomer in the art, such as urethane acrylate, epoxy acrylate, polyester acrylate or polyether acrylate; or a multifunctional acrylate as will be described later.

In one embodiment, the pressure-sensitive adhesive layer formed of the composition including both of the thermocurable component and the active energy ray-curable component may include both of a cross-linked structure including the acrylic polymer cross-linked by the multifunctional cross-linking agent and the cross-linked structure including the polymerized active energy ray-polymerizable compound.

The above pressure-sensitive adhesive layer may be referred to as a pressure-sensitive adhesive that includes a so-called interpenetrating polymer network (hereinafter referred to as "IPN"). The term "IPN" may refer to a state where at least two kinds of cross-linked structures are included in the pressure-sensitive adhesive layer. In one embodiment, the at least two kinds of cross-linked structures may be included under the state where they are entangled, linked or penetrated to each other. If the pressure-sensitive adhesive layer includes the IPN, it may show excellent durability even under the severe conditions, and also may be used to realize an optical device having excellent workability or an excellent ability to prevent light leakage or crosstalk.

As the multifunctional cross-linking agent and the acrylic polymer included in the cross-linked structure of the pressure sensitive adhesive layer including the IPN, the components as described in the pressure sensitive adhesive layer including the thermocurable component may be used.

Also, as the active energy ray-polymerizable compound in the cross-linked structure of the polymerized active energy ray-polymerizable compound, the components as described in the composition including the active energy ray-polymerizable compound may be used.

In one embodiment, the active energy ray-polymerizable compound may be a multifunctional acrylate. Any compounds including at least two (meth)acryloyl groups may be used as the multifunctional acrylate. For example, the multifunctional acrylate usable herein may include a difunctional acrylate such as 1,4-butanediol di(meth)acrylate, 1,6-hexanediol di(meth)acrylate, neopentylglycol di(meth)acrylate, polyethylene glycol di(meth)acrylate, neopentylglycol adipate di(meth)acrylate, hydroxyl puivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol(meth)acrylate, dimethylol dicyclopentane di(meth)acrylate, ethyleneoxide-modified hexahydrophthalic di(meth)acrylate, tricyclodecane dimethanol (meth)acrylate, neopentylglycol-modified trimethylpropane di(meth)acrylate, adamantane di(meth)acrylate or 9,9-bis[4-(2-acryloyloxyethoxy)phenyl]fluorene; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane (meth)acrylate or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; and a hexafunctional acrylate such as dipentaerythritol hexa(meth)acrylate, caprolactone-modified dipentaerythritol hexa(meth)acrylate or urethane (meth)acrylate (for example, a hexafunctional acrylate such as a reaction product of an isocyanate monomer and trimethylolpropane tri(meth)acrylate, and the like.).

In one embodiment, a multifunctional acrylate including a ring structure in its molecule may be used. The ring structure included in the multifunctional acrylate may be a carbocyclic structure or a heterocyclic structure. Also, the ring structure may be a monocyclic structure or a polycyclic structure. Examples of the multifunctional acrylate having a ring structure may include a monomer having an isocyanurate structure, such as tris(meth)acryloxy ethyl isocyanurate, and a hexafunctional acrylate such as isocyanate-modified urethane (meth)acrylate (for example, a reaction product of an isocyanate monomer and trimethylolpropane tri(meth)acrylate, etc.), but it is not limited thereto.

The active energy ray-polymerizable compound forming the cross-linked structure in the pressure-sensitive adhesive layer including the IPN may be, for example, included in an amount of 5 to 40 parts by weight, relative to 100 parts by weight of the acrylic polymer, but the amount may be varied if necessary.

Along with the above components, the pressure-sensitive adhesive layer may further include other various additives known in the art.

For example, the composition including the active energy ray-curable component may further include a photoinitiator to facilitate a polymerization reaction of the components. Also, the pressure-sensitive adhesive layer may further include at least one additive selected from the group consisting of a silane coupling agent, a tackifier, an epoxy resin, a curing agent, a UV stabilizer, an antioxidant, a toning agent, a reinforcing agent, a filler, an antifoaming agent, a surfactant and a plasticizer.

The pressure-sensitive adhesive layer may be formed, for example, by coating a pressure-sensitive adhesive composition prepared by mixing the above-described components by a tool such as a bar coater or a comma coater, and then curing it. Also, a method of the curing is not particularly limited. For example, the pressure-sensitive adhesive composition may be cured by maintaining it at an appropriate temperature to induce a cross-linking reaction of the acrylic polymer and the multifunctional cross-linking agent, and/or by irradiating a composition with active energy rays so as to polymerize the active energy ray-curable compound. If both of the curing methods, i.e., maintaining the composition at an appropriate temperature and irradiating the composition with active energy rays, are required to be performed, they may be performed sequentially or simultaneously. In the above, the irradiation with the active energy rays may be, for example, performed using a high-pressure mercury lamp, an electrodeless lamp or a xenon lamp, and the conditions such as a wavelength or light intensity of the irradiated active energy rays may be selected to properly perform polymerization of the active energy ray-curable compound.

In one embodiment, the pressure-sensitive adhesive layer may have a storage modulus at 25° C. of 0.02 MPa or more, 0.05 MPa or more or greater than 0.08 MPa, or greater than 0.08 MPa and also not more than 0.25 MPa, 0.09 MPa to 0.2 MPa, or 0.09 MPa to 0.16 MPa. The pressure-sensitive adhesive layer having the modulus within the above ranges may be the pressure-sensitive adhesive layer including the IPN structure.

In another embodiment, the pressure-sensitive adhesive layer may have a storage modulus at 25° C. of 0.02 MPa to 0.08 MPa or 0.04 MPa to 0.08 MPa. The pressure-sensitive adhesive layer having the modulus within the above ranges may be the pressure-sensitive adhesive layer including the cross-linked structure of the thermocurable component.

This application is also directed to a method of manufacturing an optical device. In one embodiment, the method may include attaching the polarizer and the liquid crystal layer by the adhesive.

In the above, for example, the liquid crystal layer may be formed by forming an alignment layer on the substrate layer, coating a liquid crystal composition including the polymerizable liquid crystal compounds on the alignment layer and then polymerizing the liquid crystal composition under the state where the liquid crystal compounds are aligned in a predetermined direction.

The alignment layer may be, for example, formed by forming polymer film such as polyimide on the substrate layer, and then rubbing it or by coating a photo alignable compound, and then aligning it by irradiation with linearly polarized light, or by a imprinting method such as a nano imprinting method. Various methods of forming the alignment layer are known in the art according to desired alignment patterns, for example, patterns of the first and second regions.

The coating layer of the liquid crystal composition may be formed by coating the composition on the alignment layer on the substrate layer using a known method. The liquid crystal layer may be formed by aligning the liquid crystal composition according to an alignment pattern of the alignment layer under the coating layer and then polymerizing the liquid crystal composition.

A method of attaching the liquid crystal layer and the polarizer is not particularly limited. For example, the liquid crystal layer may be attached to the polarizer by coating the adhesive composition on the liquid crystal layer or the polarizer, laminating the liquid crystal layer and the polarizer by the coating layer and then curing the adhesive composition, or by attaching the liquid crystal layer and the polarizer by the dropping method using the adhesive composition and then curing the adhesive composition. In the above, the curing of the adhesive composition may be, for example, performed by irradiating it with an appropriate amount of active energy rays having an appropriate intensity in consideration of components in the adhesive composition.

In one embodiment, the method may further include forming an additional layer such as the protection layer or the ¼-wavelength phase retardation layer. The formation method of the additional layer is not particularly limited.

This application is also directed to a stereoscopic image display device. In one embodiment, the stereoscopic image display device may include the above-described optical device.

In one embodiment, the display device may further include a display element capable of generating an image signal for the left eye (hereinafter referred to as an "L signal") and an image signal for the right eye (hereinafter referred to as an "R signal"). The optical device may be arranged on the display element so that the L and R signals generated from the display element can pass through the polarizer and then pass through the liquid crystal layer. In one embodiment, the first and second regions having different phase retardation properties to each other may be formed on the liquid crystal layer, and the optical device may be arranged so that the L signal can pass through one region among the first and second regions and the R signal can pass through the other region.

As long as the stereoscopic image display device includes the optical device as a light-dividing device, a variety of methods known in the art may be applied to manufacture of the stereoscopic image display device.

FIG. 10 shows a schematic of an illustrative embodiment of the display device and shows a structure of the device, the stereoscopic image emitted from which can be observed with wearing the polarized glasses.

For example, the device 10 may sequentially include a light source 101, a polarizing plate 102, the display element 103 and the optical device 104, as shown in FIG. 10. As the optical device 104, for example, the optical device having a structure, in which the liquid crystal layer and the polarizer are attached by the adhesive layer, and which may further includes, if necessary, the surface-treated layer, the protective layer, the phase retardation layer and/or the pressure-sensitive adhesive layer, as described referring to FIG. 1, 5, 6, 7, 8 or 9, may be used.

In the above, a direct or edge backlight that is generally used for liquid crystal display devices (LCDs) may be, for example, used as the light source 101.

The display device 103 may form the L and R signals. In one embodiment, the display element 103 may be a transmissive liquid crystal display panel including a plurality of unit pixels which are arranged in a row and/or column direction. One or two or more pixels may be combined to form an image signal-generating region (hereinafter referred to as an "RG region") for the right eye for generating an R signal and an image signal-generating region (hereinafter referred to as an "LG region") for the left eye for generating an L signal.

The RG and LG regions may, for example, have stripe shapes extending in the same direction and alternately arranged adjacent to each other, as shown in FIG. 11, or they may be formed in a lattice pattern and alternately arranged adjacent to each other, as shown in FIG. 12. In the liquid crystal layer 1042 of the optical device 104, the first and second regions may correspond to the LC and RC regions, respectively, and may be arranged in consideration of the arrangement of the RG and LG regions so that the R signal emitted from the RG region may enter into the RC region via the polarizer 1041 and the L signal may enter into the LC region via the polarizer 1041.

For example, the display element 103 may be a liquid crystal panel including a first transparent substrate, a pixel electrode, a first alignment layer, a liquid crystal layer, a second alignment layer, a common electrode, a color filter and a second transparent substrate, which are arranged sequentially in a direction from the light source 101. The polarizing plate 102 may be attached to one side of the panel into which light is incident, i.e., the side toward the light source 101, and the optical device 104 may be attached to the opposite side of the panel. A polarizer included in the polarizing plate 102 and a polarizer 1041 included in the optical device 104 may be, for example, arranged so that the absorption axes of the two polarizers can be formed at a predetermined angle, for example, at an angle of 90°. Therefore, the arrangement of the two polarizers may allow light emitted from the light source 101 to penetrate through the display element 103 or be intercepted by the display element 103.

In a driving state, unpolarized light may be emitted toward the polarizing plate 102 from the light source 101 of the display device 10. Among the light incident to the polarizing plate 102, light having a polarization axis parallel to the light transmission axis of the polarizer of the polarizing plate 102 may pass through the polarizing plate 102 and be entered into the display element 103. Light incident to the display element 103 and passing through the RG region may be converted into the R signal, and light passing through the LG region may be converted into the L signal. The R and L signals may then be entered into the polarizer 1041 of the optical device 104.

Among the light incident to the liquid crystal layer 1042 via the polarizer 1041, light passing through the LC region and light passing through the RC region are emitted, respectively, under the state where the two kinds of light have different polarization states. As described above, the R and L signals having different polarization states may enter the right and left eyes of an observer wearing the polarized glasses, respectively, and thus the observer may observe a stereoscopic image.

BRIEF DESCRIPTION OF THE DRAWINGS

FIGS. 2 and 3 show schematics of illustrative embodiments of the arrangement of first and second regions of a liquid crystal layer.

FIGS. 11 and 12 show schematics of illustrative embodiments of the arrangement of RG and LG regions.

DETAILED DESCRIPTION OF EXEMPLARY EMBODIMENTS

Figure 1:
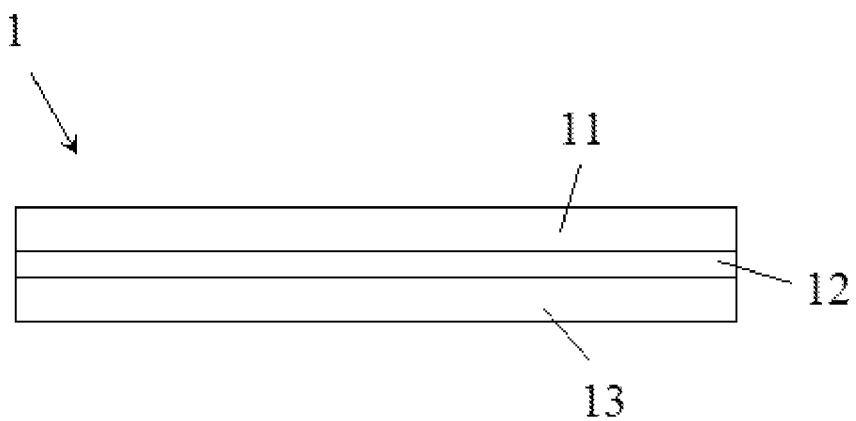
FIG. 1 shows a schematic of an illustrative embodiment of the optical device.
Figure 2:
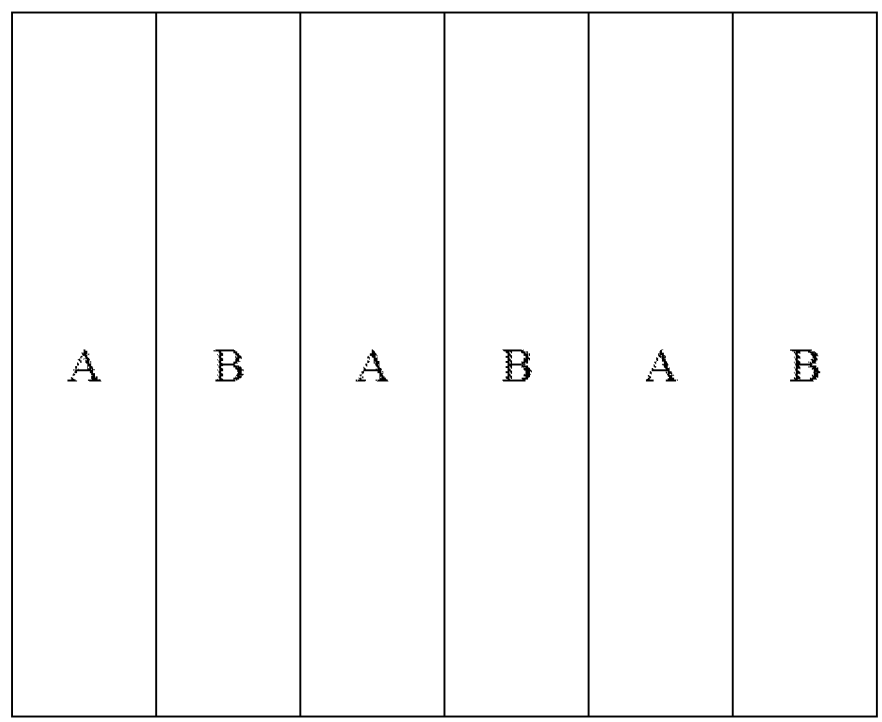
Figure 4:
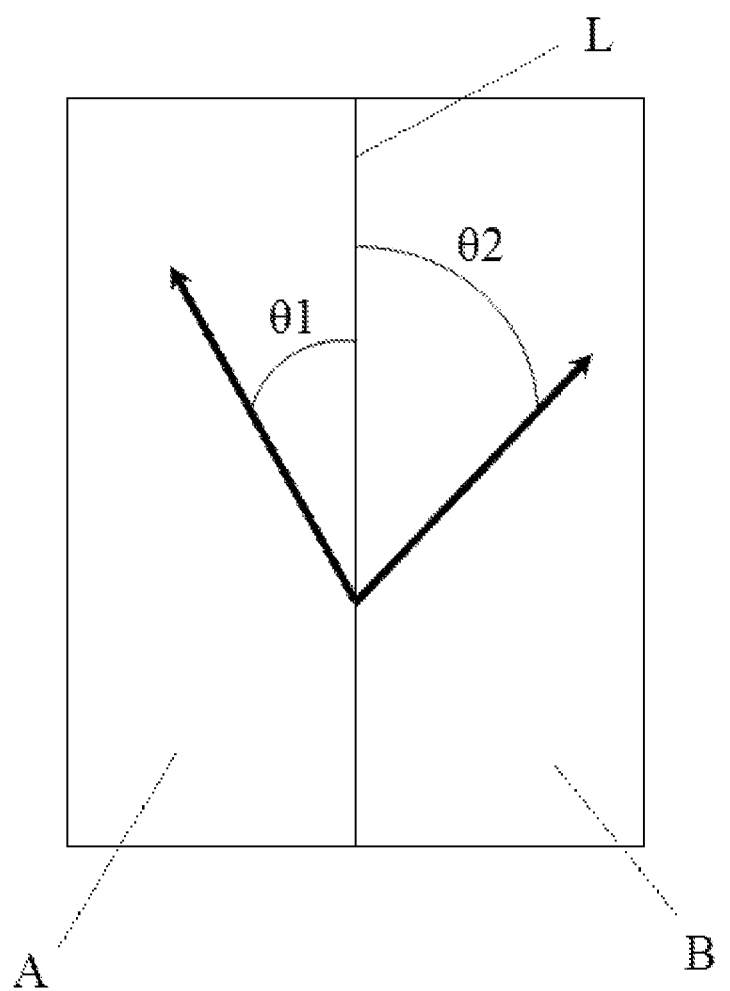
FIG. 4 shows a schematic of an illustrative embodiment of the arrangement of optical axes of the first and second regions of the liquid crystal layer.
Figure 5:
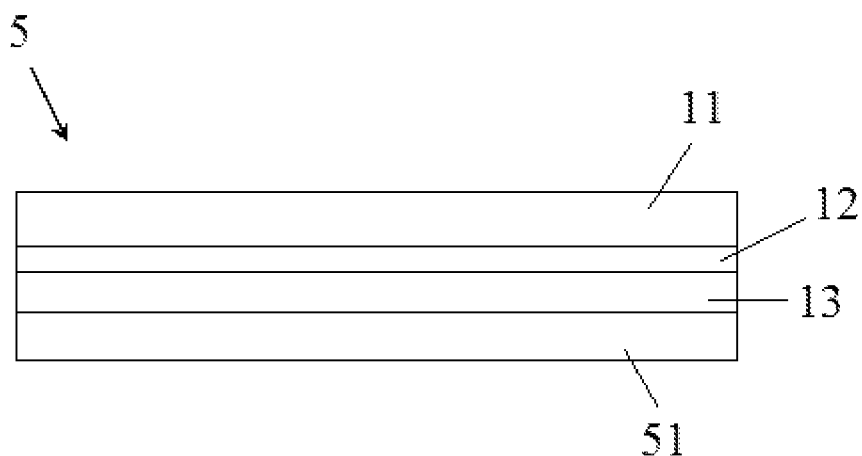
FIGS. 5 to 9 show schematics of illustrative embodiments of optical devices.
Figure 6:
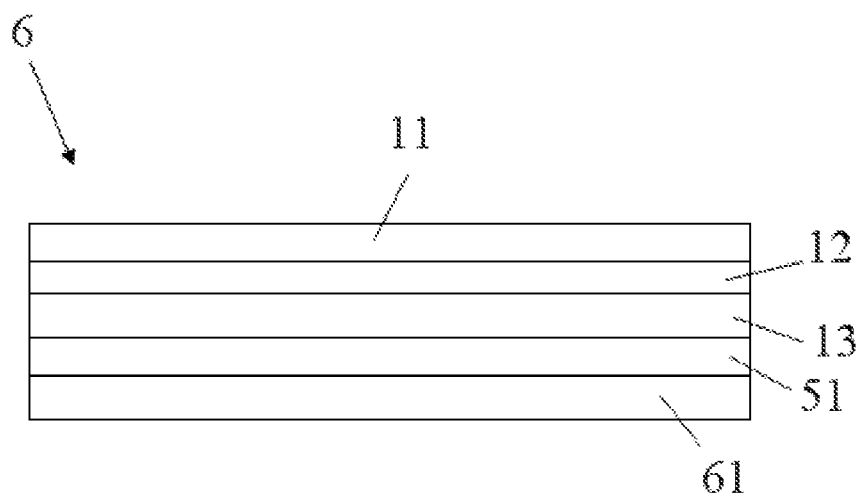
Figure 7:
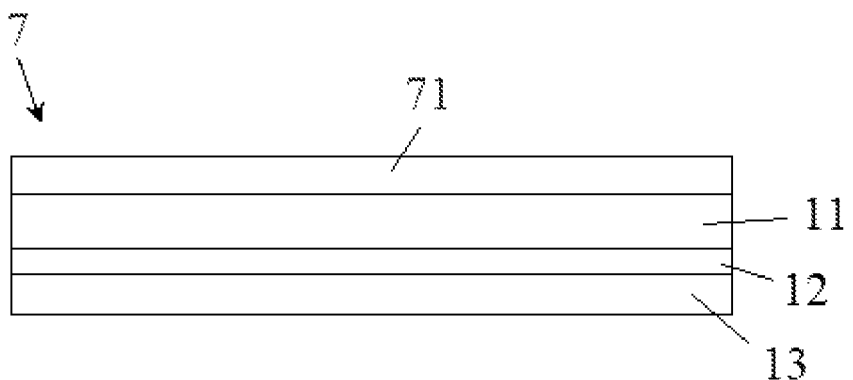
Figure 8:
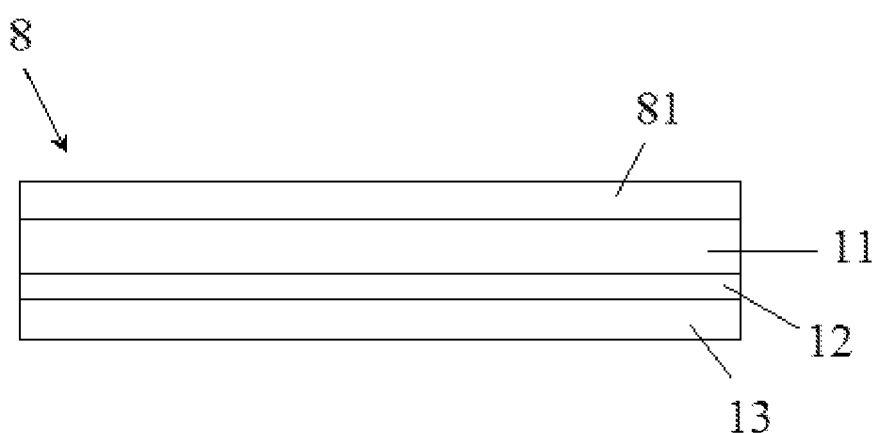
Figure 9:
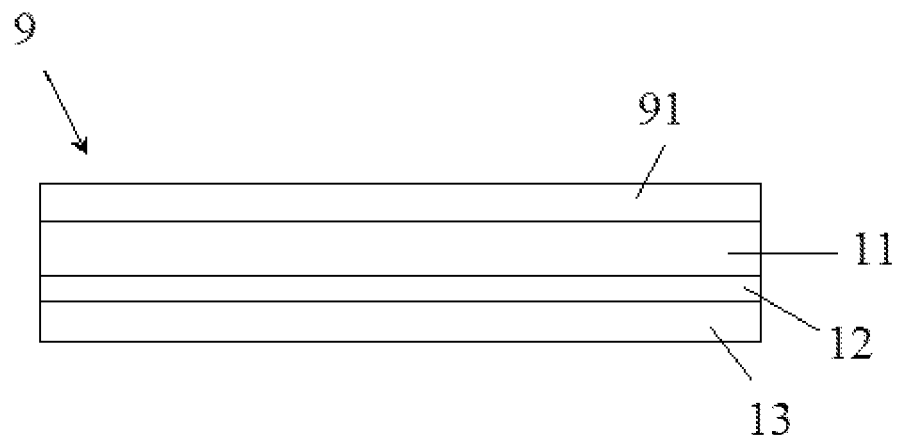
Figure 10:
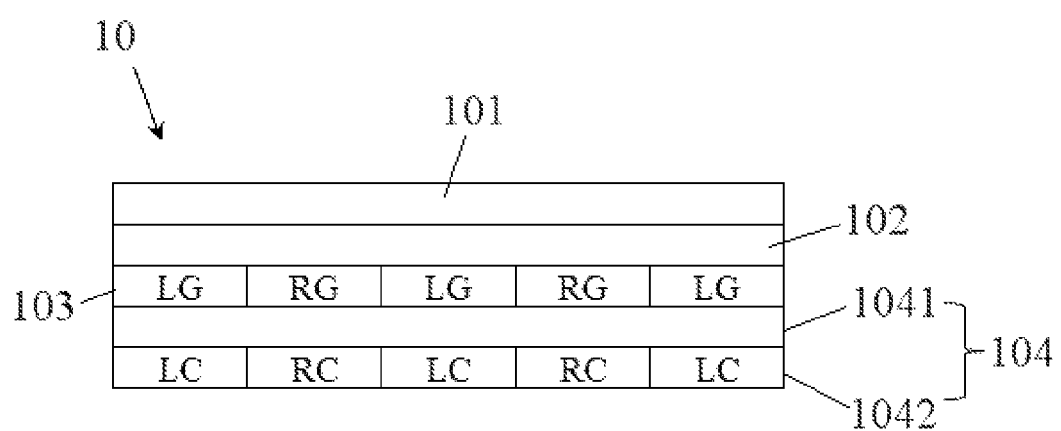
FIG. 10 shows a schematic of an illustrative embodiment of the stereoscopic image display device.
Figure 11:
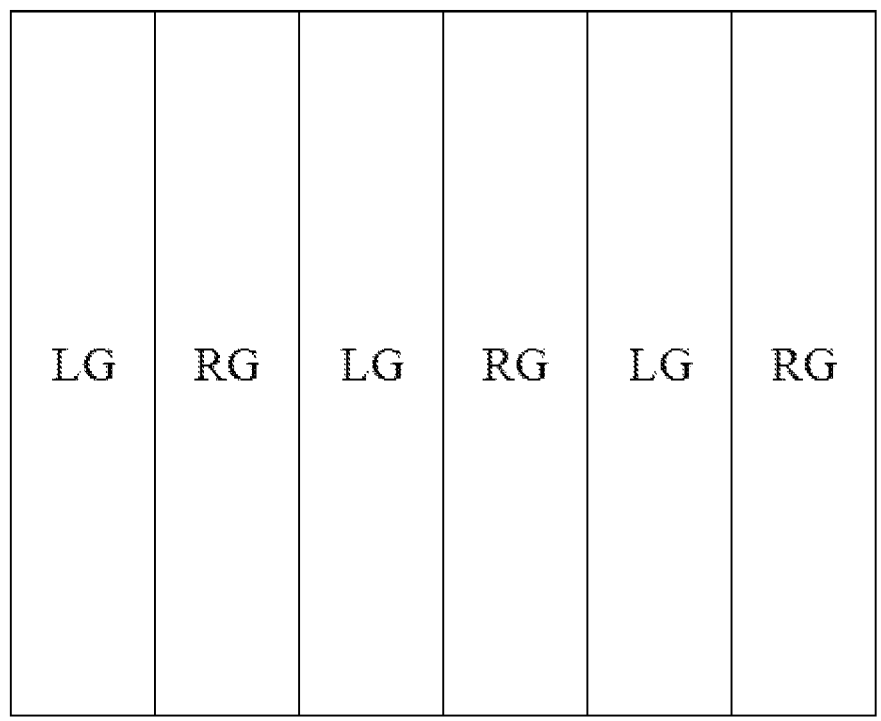

Hereinafter, illustrative embodiments of the optical device will be described in detail. However, the optical element is not limited to the embodiments disclosed below, but can be implemented in various forms.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of illustrative embodiments. The term "and/or" includes any and all combinations of one or more of the associated listed items.

The terminology used herein is for the purpose of describing particular embodiments only and is not intended to be limiting of illustrative embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

The physical properties of optical devices prepared in Examples and Comparative Examples were evaluated as follows.

1. Measurement of Glass Transition Temperature of Adhesive Layer

A glass transition temperature of an adhesive layer was measured at a heating rate of 10° C./min using a differential scanning calorimeter (DSC) with respect to the adhesive layer formed by the below method. The adhesive layer was formed by coating a prepared adhesive composition on a release-treated surface of a releasing PET sheet so as for the coating layer to have a thickness of 10 μm after being cured, laminating a release-treated surface of another releasing PET on the coating layer, and then irradiating the coating layer with UV rays using a UV irradiation device (metal halide lamp) (UV A regions, 500 mJ/cm$^2$).

2. Evaluation of Adhesion Strength

The adhesion strength was measured by measuring the peeling strength of the polarizer with respect to the substrate layer. The peeling strength was evaluated by peeling the polarizer at a peeling angle of 90° and a peeling rate of 300 m/min from the optical device, which was prepared in Examples or Comparative Examples, and in which the substrate layer, the alignment layer, the liquid crystal layer, the adhesive layer and the polarizer were sequentially formed. The peeling test was carried out with respect to a piece prepared by cutting the prepared optical device so as for the piece to have a width of 20 mm and a length of 100 mm. The evaluation criteria were as follows.

<Evaluation Criteria>

O: The case where peel strength of greater than 1 N/cm is measured.

X: The case where peel strength of 1 N/cm or less is measured.

3. Evaluation of Thermal Shock Property

Each of the optical devices prepared in Examples and Comparative Examples was cut, and then attached to a glass substrate by a pressure-sensitive adhesive layer. Thereafter, one cycle, in which each optical device was kept at −40° C. for 1 hour and then kept at 80° C. for 1 hour, was repeated 100 times. Thereafter, changes in appearance of the optical device were observed with the naked eye. The case where there was no change in the appearance of the optical device was evaluated as "O," and the case where changes such as cracks were observed in the optical device was evaluated as "X."

4. Evaluation of Durability of Liquid Crystal Layer

The durability of the liquid crystal layer was evaluated by measuring a variation of a phase difference value caused after performing a durability test with respect to the optical device prepared in Examples or Comparative Examples. The optical device was cut into pieces having a width of 10 cm and a length of 10 cm, and then attached to a glass substrate by a pressure-sensitive adhesive layer. The optical device was then kept under a temperature of 80° C. for 100 hours or 250 hours, which was the heat-resistant condition. Then, a decrease (%) in phase difference values of the liquid crystal layer before and after being kept under the heat-resistant condition was calculated as a percentage. The durability of the liquid crystal layer was evaluated as the below evaluation criteria. In the above, the phase difference value was measured with respect to light having a wavelength of 550 nm by using Axoscan (commercially available from Axomatrix) according to the manufacturer's manual.

<Evaluation Criteria>

O: The case where variations in phase difference values of all the optical devices after being kept under a heat-resistant condition for 100 hours and 250 hours are less than 8%.

X: The case where variation in phase difference value of any one of the optical devices after being kept under a heat-resistant condition for 100 hours and 250 hours is 8% or more.

Preparative Example 1

Preparation of Adhesive Composition (A)

A composition was prepared by mixing 40 parts by weight of hydroxyethyl acrylate, 20 parts by weight of phenoxy ethyl acrylate, 20 parts by weight of isobornyl acrylate and 20 parts by weight of an alicyclic epoxy compound (3,4-epoxycyclohexylmethyl-3,4'-epoxycyclohexanecarboxylate, celloxide C2021P commercially available from Dicel), and then further mixed with 3 parts by weight of a photoinitiator (Irgacure 819) and 3 parts by weight of a cationic initiator (diphenyl-(4-phenylthio)phenylsulfonium hexafluorophosphate, CPI100P commercially available from SANAPRO) to prepare an adhesive composition (A).

Preparative Example 2

Preparation of Adhesive Composition (B)

A composition was prepared by mixing 30 parts by weight of hydroxyethyl acrylate, 15 parts by weight of phenoxy ethyl acrylate, 15 parts by weight of isobornyl acrylate, 20 parts by weight of an alicyclic epoxy compound (3,4-epoxycyclohexylmethyl-3,4'-epoxycyclohexanecarboxylate, celloxide C2021P commercially available from Dicel) and 20 parts by weight of 1,4-cyclohexanedimethanol diglycidyl ether, and then further mixed with 3 parts by weight of a photoinitiator (Irgacure 819) and 3 parts by weight of a cationic initiator (diphenyl-(4-phenylthio)phenylsulfonium hexafluorophosphate, CPI100P commercially available from SANAPRO) to prepare an adhesive composition (B).

Preparative Example 3

Preparation of Adhesive Composition (C)

A composition was prepared by mixing 15 parts by weight of hydroxyethyl acrylate, 6 parts by weight of phenoxy ethyl acrylate, 9 parts by weight of isobornyl acrylate, 30 parts by weight of an alicyclic epoxy compound (3,4-epoxycyclohexylmethyl-3,4'-epoxycyclohexanecarboxylate, celloxide C2021P commercially available from Dicel), 20 parts by weight of vinylcyclohexenemonooxide and 20 parts by weight of bisphenol F epoxy, and then further mixed with 0.5 parts by weight of a photoinitiator (Irgacure 819) and 6 parts by weight of a cationic initiator (diphenyl-(4-phenylthio)phenylsulfonium hexafluorophosphate, CPI100P commercially available from SANAPRO) to prepare an adhesive composition (C).

Preparative Example 4

Preparation of Adhesive Composition (D)

A composition was prepared by mixing 10 parts by weight of hydroxyethyl acrylate, 5 parts by weight of phenoxy ethyl acrylate, 5 parts by weight of isobornyl acrylate, 30 parts by weight of an alicyclic epoxy compound (3,4-epoxycyclohexylmethyl-3,4'-epoxycyclohexanecarboxylate, celloxide C2021P commercially available from Dicel), 20 parts by weight of vinylcyclohexenemonooxide and 30 parts by weight of bisphenol F epoxy, and then further mixed with 0.5 parts by weight of a photoinitiator (Irgacure 819) and 6 parts by weight of a cationic initiator (diphenyl-(4-phenylthio)phenylsulfonium hexafluorophosphate, CPI100P commercially available from SANAPRO) to prepare an adhesive composition (D).

Preparative Example 5

Preparation of Adhesive Composition (E)

22 parts by weight of an alicyclic epoxy compound (3,4-epoxycyclohexylmethyl-3,4'-epoxycyclohexanecarboxylate, celloxide C2021P commercially available from Dicel), 22 parts by weight of 1,4-cyclohexanedimethanol diglycidyl ether, 50 parts by weight of 3-ethyl-3-hydroxymethyloxetane (OXT101) and 6 parts by weight of a cationic initiator (diphenyl-(4-phenylthio)phenylsulfonium hexafluorophosphate, CPI100P commercially available from SANAPRO) were mixed to prepare an adhesive composition (E).

Preparative Example 6

Preparation of Adhesive Composition (F)

22 parts by weight of an alicyclic epoxy compound (3,4-epoxycyclohexylmethyl-3,4'-epoxycyclohexanecarboxylate, celloxide C2021P commercially available from Dicel), 22 parts by weight of 1,4-cyclohexanedimethanol diglycidyl ether, 10 parts by weight of 3-ethyl-3[[3-ethyloxetane-3-yl]methoxy]methyl (OXT221), 40 parts by weight of 3-ethyl-3-hydroxymethyloxetane (OXT101) and 6 parts by weight of a cationic initiator (diphenyl-(4-phenylthio)phenylsulfonium hexafluorophosphate, CPI100P commercially available from SANAPRO) were mixed to prepare an adhesive composition (F).

Preparative Example 7

Preparation of Adhesive Composition (G)

22 parts by weight of an alicyclic epoxy compound (3,4-epoxycyclohexylmethyl-3,4'-epoxycyclohexanecarboxylate, celloxide C2021P commercially available from Dicel), 22 parts by weight of 1,4-cyclohexanedimethanol diglycidyl ether, 25 parts by weight of 3-ethyl-3[[3-ethyloxetane-3-yl]methoxy]methyl (OXT221), 25 parts by weight of 3-ethyl-3-hydroxymethyloxetane (OXT101) and 6 parts by weight of a cationic initiator (diphenyl-(4-phenylthio)phenylsulfonium hexafluorophosphate, CPI commercially available from SANAPRO) were mixed to prepare an adhesive composition (G).

Preparative Example 8

Preparation of Adhesive Composition (H)

50 parts by weight of 2-hydroxyethyl acrylate, 10 parts by weight of phenoxyethyl acrylate, 30 parts by weight of isobornyl acrylate, 5 parts by weight of acryloyloxy ethyl isocayanate (AOI), 5 parts by weight of urethane acrylate and 3 parts by weight of a photoinitiator (Irgacure 819) were mixed to prepare an adhesive composition (H).

Preparative Example 9

Preparation of Adhesive Composition (I)

40 parts by weight of N-(2-hydroxyethyl)acrylamide, 30 parts by weight of hydroxyethyl acrylate, 30 parts by weight of CHDOL (1,4-dioxaspiro[4,5]dec-2-yl)methyl acylate) and 3 parts by weight of a photoinitiator (Irgacure 819) were mixed to prepare an adhesive composition (I).

Preparative Example 10

Preparation of Adhesive Composition (J)

50 parts by weight of N-(2-hydroxyethyl)acrylamide, 20 parts by weight of hydroxyethyl acrylate, 40 parts by weight of CHDOL (1,4-dioxaspiro[4,5]dec-2-yl)methyl acylate) and 3 parts by weight of a photoinitiator (Irgacure 819) were mixed to prepare an adhesive composition (J).

Preparative Example 11

Preparation of Liquid Crystal Layer (A)

A composition for forming a photo alignment layer was coated on one surface of a TAC substrate (refractive index: 1.49, thickness: 80,000 nm) so as for the coating layer to have a thickness of approximately 1,000 Å after being dried, and then dried at 80° C. for 2 minutes in an oven. In the above, as the composition for forming a photo alignment layer, a composition (polynorbornene:acryl monomer:photoinitiator=2: 1:0.25 (weight ratio)) was used, which was prepared by mixing a mixture of an acrylic monomer and polynorbornene (molecular weight ($M_w$)=150,000) having a cinnamate group represented by the following Formula 14 with a photoinitiator (Irgacure 907) and then dissolving the mixture in a toluene solvent so that a solid content of the polynorbornene could amount to 2% by weight.

Formula 14

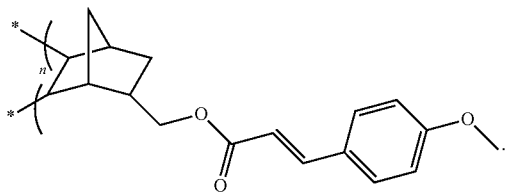

The dried composition for forming a photo alignment layer was aligned according to a method disclosed in Korean Patent Application No. 2010-0009723 to form a photo alignment layer including first and second alignment regions which were aligned in different directions. More particularly, a pattern mask in which light-transmitting portions and light-intercepting portions in stripe shapes having widths of approximately 450 μm were alternately formed in a vertical direction and a horizontal direction was disposed on an upper side of the dried composition, and a polarizing plate having two regions formed therein for transmitting two different kinds of polarized light was also disposed on an upper portion of the pattern mask. Then, the composition for forming a photo alignment layer was aligned by irradiating the composition with UV rays (300 mW/cm$^2$) for approximately 30 seconds using the polarizing plate and the pattern mask while moving the TAC substrate having the photo alignment layer formed thereon at a rate of approximately 3 in/min. Then, a liquid crystal layer was formed on the alignment-treated alignment layer. More particularly, a liquid crystal composition including 70 parts by weight of a multifunctional polymerizable liquid crystal compound represented by the following Formula A, 30 parts by weight of a monofunctional polymerizable liquid crystal compound represented by the following Formula B, and an appropriate amount of a photoinitiator was coated onto the photo alignment layer so as for the coating layer to have a thickness of approximately 1 μm after being dried, and then the liquid crystal composition was aligned according to alignment of the alignment layer under the liquid crystal layer. Then, a liquid crystal layer, which includes first and second aligned regions having different optical axes perpendicular to each other according to the alignment of the photo alignment layer under the liquid crystal layer, was cross-linked and polymerized by being irradiated with UV rays (300 mW/cm$^2$) for approximately 10 seconds.

Formula A

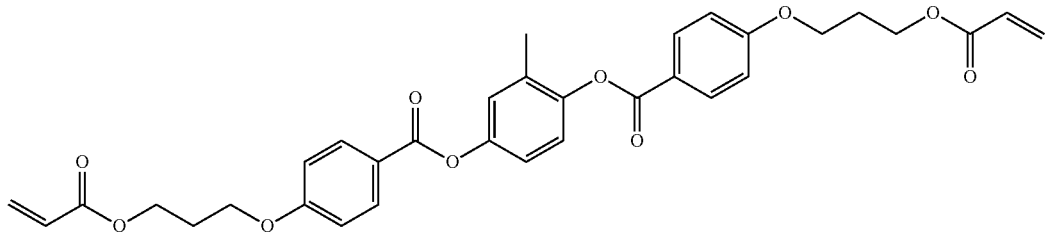

Formula B

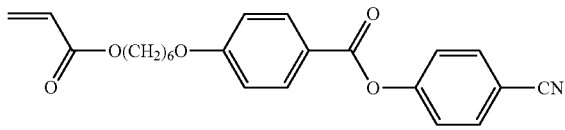

Preparative Examples 12 to 15

Preparation of Liquid Crystal Layer (B) to Liquid Crystal Layer (E)

Liquid crystal layers were prepared in the substantially same manner as in Preparative Example 11, except that a weight ratio of a multifunctional polymerizable liquid crystal compound and a monofunctional polymerizable liquid crystal compound included in the liquid crystal composition was adjusted as listed in the following Table 1.

TABLE 1

|  | Liquid crystal layer (B) | Liquid crystal layer (C) | Liquid crystal layer (D) | Liquid crystal layer (E) |
| --- | --- | --- | --- | --- |
| Multifunctional polymerizable liquid crystal compound (A) | 55 | 45 | 40 | 10 |
| Monofunctional polymerizable liquid crystal compound (B) | 45 | 55 | 60 | 90 |

Content unit: parts by weight

Example 1

An optical device was manufactured as follows. First, the liquid crystal layer included in a structure prepared in Preparative Example 11, in which the TAC substrate, the alignment layer and the liquid crystal layer were sequentially formed, was attached to the polarizer included in a polarizing plate, which included a PVA polarizer and a transparent protective film formed on one surface of the polarizer, by using the adhesive composition (B). More particularly, a surface of the liquid crystal layer was coated with the adhesive composition so as for the coating layer to have a thickness of 5 μm after being cured, and then the polarizer was laminated on the liquid crystal layer via the coating layer. Then, an adhesive layer was formed by irradiating the coating layer with UV rays (500 mJ/cm$^2$) of UV A regions from one surface of the transparent protective film, and the liquid crystal layer was attached to the polarizer. Thereafter, a conventional acrylic pressure-sensitive adhesive layer was formed on one surface of the transparent protective film of the polarizer to manufacture an optical device.

Examples 2 to 13

Each optical device was manufactured in the substantially same manner as in Example 1, except that the kinds of liquid crystal layers and the adhesive compositions and the thickness of an adhesive layer to be formed were changed as listed in the following Table 2, and the UV irradiation conditions were controlled so as for the adhesive compositions to be sufficiently cured.

TABLE 2

|  |  | Liquid crystal layers | Kinds of adhesive compositions | Adhesive layer thickness (μm) |
| --- | --- | --- | --- | --- |
| Examples | 2 | Liquid crystal layer (A) | Adhesive composition (B) | 3 |
|  | 3 | Liquid crystal layer (A) | Adhesive composition (B) | 5 |
|  | 4 | Liquid crystal layer (A) | Adhesive composition (C) | 1 |
|  | 5 | Liquid crystal layer (A) | Adhesive composition (D) | 1 |
|  | 6 | Liquid crystal layer (A) | Adhesive composition (E) | 1 |
|  | 7 | Liquid crystal layer (A) | Adhesive composition (E) | 5 |
|  | 8 | Liquid crystal layer (A) | Adhesive composition (F) | 1 |
|  | 9 | Liquid crystal layer (A) | Adhesive composition (G) | 1 |

TABLE 2-continued

|  | Liquid crystal layers | Kinds of adhesive compositions | Adhesive layer thickness (μm) |
| --- | --- | --- | --- |
| 10 | Liquid crystal layer (A) | Adhesive composition (I) | 1 |
| 11 | Liquid crystal layer (A) | Adhesive composition (J) | 1 |
| 12 | Liquid crystal layer (B) | Adhesive composition (D) | 1 |
| 13 | Liquid crystal layer (B) | Adhesive composition (F) | 1 |

Comparative Examples 1 to 13

Optical devices were manufactured in the substantially same manner as in Example 1, except that the kinds of the liquid crystal layers and the adhesive compositions and the thickness of an adhesive layer to be formed were changed as listed in the following Table 3, and the UV irradiation conditions were controlled so as for the adhesive compositions to be sufficiently cured.

TABLE 3

|  |  | Liquid crystal layers | Kinds of adhesive compositions | Adhesive layer thickness (μm) |
| --- | --- | --- | --- | --- |
| Comparative Examples | 1 | Liquid crystal layer (A) | Adhesive composition (A) | 1 |
|  | 2 | Liquid crystal layer (A) | Adhesive composition (H) | 1 |
|  | 3 | Liquid crystal layer (C) | Adhesive composition (D) | 1 |
|  | 4 | Liquid crystal layer (C) | Adhesive composition (F) | 1 |
|  | 5 | Liquid crystal layer (D) | Adhesive composition (A) | 1 |
|  | 6 | Liquid crystal layer (D) | Adhesive composition (B) | 1 |
|  | 7 | Liquid crystal layer (D) | Adhesive composition (D) | 1 |
|  | 8 | Liquid crystal layer (D) | Adhesive composition (E) | 1 |
|  | 9 | Liquid crystal layer (D) | Adhesive composition (E) | 7 |
|  | 10 | Liquid crystal layer (D) | Adhesive composition (F) | 1 |
|  | 11 | Liquid crystal layer (E) | Adhesive composition (E) | 1 |
|  | 12 | Liquid crystal layer (E) | Adhesive composition (F) | 1 |
|  | 13 | Liquid crystal layer (E) | Adhesive composition (E) | 7 |

The optical devices prepared in Examples and Comparative Examples were evaluated for physical properties using the above-described method. The evaluation results are listed in the following Tables 4 and 5, respectively.

TABLE 4

|  |  | Glass transition temperatures of adhesive layers (° C.) | Adhesion strength | Thermal shock property | Durability of liquid crystal layers |
| --- | --- | --- | --- | --- | --- |
| Examples | 1 | 40 | ◯ | ◯ | ◯ |
|  | 2 | 40 | ◯ | ◯ | ◯ |
|  | 3 | 40 | ◯ | ◯ | ◯ |
|  | 4 | 75 | ◯ | ◯ | ◯ |
|  | 5 | 85 | ◯ | ◯ | ◯ |
|  | 6 | 45 | ◯ | ◯ | ◯ |
|  | 7 | 45 | ◯ | ◯ | ◯ |

TABLE 4-continued

|  | Glass transition temperatures of adhesive layers (° C.) | Adhesion strength | Thermal shock property | Durability of liquid crystal layers |
|---|---|---|---|---|
| 8 | 60 | ○ | ○ | ○ |
| 9 | 90 | ○ | ○ | ○ |
| 10 | 40 | ○ | ○ | ○ |
| 11 | 60 | ○ | ○ | ○ |
| 12 | 85 | ○ | ○ | ○ |
| 13 | 60 | ○ | ○ | ○ |

TABLE 5

| | | Glass transition temperatures of adhesive layers (° C.) | Adhesion strength | Thermal shock property | Durability of liquid crystal layers |
|---|---|---|---|---|---|
| Comparative Examples | 1 | 30 | ○ | X | ○ |
| | 2 | 35 | ○ | X | ○ |
| | 3 | 85 | ○ | ○ | X |
| | 4 | 60 | X | ○ | X |
| | 5 | 30 | X | X | X |
| | 6 | 40 | X | ○ | X |
| | 7 | 85 | X | ○ | X |
| | 8 | 45 | X | ○ | X |
| | 9 | 45 | X | X | X |
| | 10 | 60 | X | ○ | X |
| | 11 | 45 | X | ○ | X |
| | 12 | 60 | X | ○ | X |
| | 13 | 45 | X | X | X |

The optical device according to one embodiment may be a light-dividing device, for example, a device that can divide incident light into at least two kinds of light having different polarization states. For example, the optical device can be used to realize a stereoscopic image.

What is claimed is:

1. An optical device comprising:
   an adhesive layer having a glass transition temperature of 36° C. or more; and
   a polarizer and a liquid crystal layer which are attached by the adhesive layer; and
   wherein, the liquid crystal layer comprises a multifunctional polymerizable liquid crystal compound and a monofunctional polymerizable liquid crystal compound, the monofunctional polymerizable liquid crystal compound is comprised in an amount of greater than 0 parts by weight and not more than 100 parts by weight, relative to 100 parts by weight of the multifunctional polymerizable liquid crystal compound.

2. The optical device of claim 1, satisfying the Equation 1:

$$X < 8\% \quad \text{Equation 1}$$

wherein X represents a percentage of the absolute value of a variation in a phase difference value of the liquid crystal layer obtained after keeping the optical device at 80° C. for 100 hours, relative to the initial phase difference value of the liquid crystal layer of the optical device.

3. The optical device of claim 1, wherein the liquid crystal compound is represented by the Formula 1:

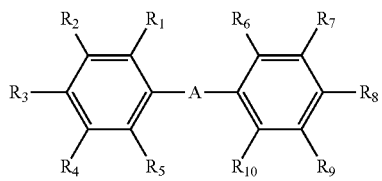

Formula 1 wherein A is a single bond, —COO— or —OCO—, and $R_1$ to $R_{10}$ are each independently hydrogen, a halogen, an alkyl group, an alkoxy group, an alkoxycarbonyl group, a cyano group, a nitro group, —O-Q-P or a substituent represented by the Formula 2, or a pair of two adjacent substituents among $R_1$ to $R_5$ or a pair of two adjacent substituents among $R_6$ to $R_{10}$ is joined together to form a benzene substituted with —O-Q-P, provided that at least one of the $R_1$ to $R_{10}$ is —O-Q-P or the substituent of the Formula 2, or at least one pair of two adjacent substituents among $R_1$ to $R_5$ or among $R_6$ to $R_{10}$ is joined together to form a benzene substituted with —O-Q-P, where Q is an alkylene group or an alkylidene group, and P is an alkenyl group, an epoxy group, a cyano group, a carboxyl group, an acryloyl group, a methacryloyl group, an acryloyloxy group or a methacryloyloxy group,

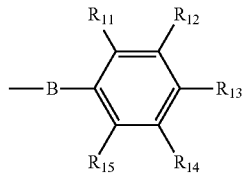

Formula 2 wherein the "-" indicated on the left side of B means that B directly binds to the benzene ring of Formula 1, B is a single bond, —COO— or —OCO—, and $R_{11}$ to $R_{15}$ are each independently hydrogen, a halogen, an alkyl group, an alkoxy group, an alkoxycarbonyl group, a cyano group, a nitro group or —O-Q-P, or a pair of two adjacent substituents among $R_{11}$ to $R_{15}$ is joined together to form a benzene substituted with —O-Q-P, provided that at least one of the $R_{11}$ to $R_{15}$ is —O-Q-P, or a pair of two adjacent substituents among $R_{11}$ to $R_{15}$ is joined together to form a benzene substituted with —O-Q-P, where Q is an alkylene group or an alkylidene group, and P is an alkenyl group, an epoxy group, a cyano group, a carboxyl group, an acryloyl group, a methacryloyl group, an acryloyloxy group or a methacryloyloxy group.

4. The optical device of claim 1, wherein the polymerizable liquid crystal compounds are comprised in the liquid crystal layer under the state where they are horizontally aligned.

5. The optical device of claim 1, wherein a difference between the refractive index in the in-plane slow axis direction of the liquid crystal layer and the refractive index in the in-plane fast axis direction of the liquid crystal layer is from 0.05 to 0.2, and the liquid crystal layer has a thickness of 0.5 µm to 2.0 µm.

6. The optical device of claim 1, wherein the liquid crystal layer comprises a first region and a second region, which have different phase retardation properties to each other.

7. The optical device of claim 6, wherein the first and second regions have optical axes formed in different directions to each other.

8. The optical device of claim 7, wherein a line bisecting an angle formed by the optical axes of the first and the second regions is vertical or horizontal to the absorption axis of the polarizer.

9. The optical device of claim 1, further comprising a substrate layer on one side of which the liquid crystal layer is formed.

10. The optical device of claim 9, wherein the substrate layer has a refractive index lower than the liquid crystal layer.

11. The optical device of claim 9, further comprising a surface-treated layer which is formed on the surface of the substrate layer.

12. The optical device of claim 11, wherein the surface-treated layer is a high-hardness layer, a glare preventing layer or a low-reflective layer.

13. The optical device of claim 1, wherein the adhesive layer has a glass transition temperature of 38° C. or more.

14. The optical device of claim 1, wherein the adhesive layer has a glass transition temperature of 40° C. or more.

15. The optical device of claim 1, wherein the adhesive layer has a thickness of 6 μm or less.

16. The optical device of claim 1, wherein the adhesive layer comprises an active energy ray-curable adhesive.

17. The optical device of claim 1, wherein the adhesive layer comprises at least one selected from the group consisting of a radically polymerizable compound and a cationically polymerizable compound.

18. The optical device of claim 1, further comprising a primer layer between the polarizer and the adhesive layer or between the liquid crystal layer and the adhesive layer.

19. The optical device of claim 1, further comprising a phase retardation layer which is positioned on one side of the polarizer.

20. The optical device of claim 1, further comprising a pressure-sensitive adhesive layer that is formed on one side of the polarizer, and has a storage modulus at 25° C. of 0.02 MPa to 0.08 MPa, and that comprises a cross-linked structure comprising an acrylic polymer that is cross-linked by a multifunctional cross-linking agent.

21. The optical device of claim 1, further comprising a pressure-sensitive adhesive layer that is formed on one side of the polarizer, and has a storage modulus at 25° C. of greater than 0.08 MPa, and that comprises a cross-linked structure comprising an acrylic polymer that is cross-linked by a multifunctional cross-linking agent and a cross-linked structure comprising polymerized active energy ray-polymerizable compounds.

22. A stereoscopic image display device comprising the optical device defined in claim 1.

23. The stereoscopic image display device of claim 22, further comprising a display element configured to generate image signals for left and right eyes, wherein, the liquid crystal layer of the optical device comprises a first region and a second region, which have different phase retardation properties to each other, and wherein the optical device is disposed on the display element so that the image signal for left eye can pass through one region among the first and second regions of the liquid crystal layer, and the image signal for right eye can pass through other region among the first and second regions of the liquid crystal layer.

* * * * *